(12) United States Patent
Oloman

(10) Patent No.: US 8,709,680 B2
(45) Date of Patent: Apr. 29, 2014

(54) MIXED REACTANT FLOW-BY FUEL CELL

(75) Inventor: Colin Oloman, Vancouver (CA)

(73) Assignee: 0798465 B.C. Ltd., Vancouver, British Columbia (CA)

( * ) Notice: Subject to any disclaimer, the term of this patent is extended or adjusted under 35 U.S.C. 154(b) by 131 days.

(21) Appl. No.: 13/057,988

(22) PCT Filed: Aug. 7, 2009

(86) PCT No.: PCT/CA2009/001116
§ 371 (c)(1),
(2), (4) Date: Mar. 15, 2001

(87) PCT Pub. No.: WO2010/015092
PCT Pub. Date: Feb. 11, 2010

(65) Prior Publication Data
US 2011/0171555 A1 Jul. 14, 2011

Related U.S. Application Data

(60) Provisional application No. 61/136,034, filed on Aug. 7, 2008.

(51) Int. Cl.
*H01M 8/04* (2006.01)
(52) U.S. Cl.
CPC ...... *H01M 8/04082* (2013.01); *H01M 8/04186* (2013.01)
USPC ............ 429/514; 429/512; 429/447; 429/443
(58) Field of Classification Search
None
See application file for complete search history.

(56) References Cited

U.S. PATENT DOCUMENTS 4,863,813 A 9/1989 Dyer
4,988,582 A 1/1991 Dyer (Continued)

FOREIGN PATENT DOCUMENTS

CA 2421766 A1 3/2003
GB 994448 6/1965

(Continued)

OTHER PUBLICATIONS

Barton et al., "Mixed-Reactant, Strip-Cell Direct Methanol Fuel Cells," *Jnl. Power Sources*, vol. 96, pp. 329-336, 2001.

(Continued)

*Primary Examiner* — Ula C Ruddock
*Assistant Examiner* — Scott J Chmielecki
(74) *Attorney, Agent, or Firm* — Klarquist Sparkman, LLP

(57) ABSTRACT

A cell unit of a mixed reactant fuel cell comprises a multiphase mixed reactant fluid distributor, an anode and cathode in fluid and electronic communication with the distributor, and a separator positioned relative to one of the anode and the cathode to provide electronic insulation and ionic communication between the cell unit and another adjacent cell unit. The distributor is electronically conductive and the reactant fluid which flows through the distributor has fuel and oxidant each in separate fluid phases, wherein at least one of the fuel and oxidant fluid phases is a liquid. The capillary pressure at the anode is selected to produce a higher hold up of the fuel fluid phase than the oxidant fluid phase in the pores of the anode when the mixed reactant fluid flows through the distributor thereby suppressing transfer of oxidant to the anode from the distributor, or the capillary pressure at the cathode is selected to produce a higher hold up of the oxidant fluid phase than the fuel fluid phase in the pores of the cathode when the mixed reactant fluid flows through the distributor, thereby suppressing transfer of fuel to the cathode from the distributor; or both. The distributor extends between respective superficial electrode surfaces of the anode and cathode such that the bulk mixed reactant fluid flows through the distributor and by the superficial electrode surfaces under conditions that produce a positive net potential of the fuel cell under load.

27 Claims, 16 Drawing Sheets

(56) References Cited

U.S. PATENT DOCUMENTS

| | | | | |
|---|---|---|---|---|
| 5,094,928 | A | * | 3/1992 | Dyer .......................... 429/432 |
| 5,102,750 | A | | 4/1992 | Taylor |
| 2003/0165727 | A1 | | 9/2003 | Priestnall et al. |
| 2004/0058203 | A1 | | 3/2004 | Priestnall et al. |
| 2005/0058875 | A1 | * | 3/2005 | Jerome ........................ 429/34 |
| 2006/0078782 | A1 | * | 4/2006 | Martin et al. ................. 429/38 |
| 2006/0078785 | A1 | | 4/2006 | Masel et al. |
| 2006/0292412 | A1 | * | 12/2006 | Faghri et al. ................. 429/26 |
| 2007/0190396 | A1 | | 8/2007 | Kwak et al. |
| 2007/0292739 | A1 | | 12/2007 | Son et al. |
| 2008/0038592 | A1 | * | 2/2008 | Anderson et al. ............. 429/12 |

FOREIGN PATENT DOCUMENTS

| | | |
|---|---|---|
| WO | WO03/034524 A2 | 4/2003 |
| WO | WO2004036055 A2 | 4/2004 |

OTHER PUBLICATIONS

Barton, et al., "Mixed-Feed Direct-Methanol Fuel Cells: Materials and Design Solutions," *ECS Transactions*, vol. 1, No. 6, pp. 315-322, 2006.

E. J. Cairns, "Aqueous Carbonate Electrolyte Fuel Cells," *Handbook of Fuel Cells*, John Wiley & Sons, New York, vol. 1, Ch. 17, pp. 302-304, 2003.

Cheng et al., "A Liquid-Gas Phase Mixed-Reactant Fuel Cell with a RuSeW Cathode Electrocatalyst," *Jnl. Power Sources*, vol. 183, pp. 678-681, May 16, 2008.

Ha et al., "Performance Characterization of Pd/C Nanocatalyst for Direct Formic Acid Fuel Cells," *Jnl. Power Sources*, vol. 144 pp. 28-34, Feb. 19, 2005.

David Jollie, "Opening Doors to Fuel Cell Commercilisation," Fuel Cell Today, www.fuelcelltoday.com, pp. 1-5, Sep. 10, 2004.

Kothandaraman et al., "Methanol Anode Modified by Semipermeable Membrane for Mixed-Feed Direct Methanol Fuel Cells," *Jnl. Electrochem. Soc.*, vol. 155, No. 9, pp. B865-868, Jul. 2, 2008.

Preistnall et al., "Compact Mixed Reactant Fuel Cells," *Jnl. Power Sources*, vol. 106, pp. 21-30, 2002.

Qian et al., "Architecture for Portable Direct Liquid Fuel Cells," *Jnl. Power Sources*, vol. 154, pp. 202-213, Jan. 19, 2006.

Rice et al., "Direct Formic Acid Fuel Cells," *Jnl. Power Sources*, vol. 111, pp. 83-89, 2002.

Scott et al., "A Mixed-Reactants Solid-Polymer-Electrolyte Direct Methanol Fuel Cell,", *Jnl. Power Sources*, vol. 126, pp. 67-75, 2004.

Shukla et al., "A Solid-Polymer Electrolyte Direct Methanol Fuel Cell with a Mixed Reactant and Air Anode," *Jnl. Power Sources*, vol. 111, pp. 43-51, 2002.

Vielstich, "Fuel Cells, Modern Processes for the Electrochemcial Production of Energy," Wiley Interscience, New York, 1970, pp. 90-99, 274-281, and 310-311.

International Search Report and Written Opinion of the International Searching Authority, mailed Nov. 6, 2009, for corresponding International Application No. PCT/CA2009/001116, 10 pages.

Arthur W. Adamson, "Physical Chemistry of Surfaces," John Wiley & Sons, Inc., 1990, pp. xvi, xvii, 41, 43, 379, 385, 389-391, 396-399, 495-496.

Ross and Morrison, "Colloidal Systems and Interfaces," John Wiley & Sons, Inc., 1988, pp. xiii, 71,-72, 77, 113, 118-119, 121-122.

* cited by examiner

Experiment 6

| Run No. | 520 | | Date | 10-Jan | 2009 | Lab bk | | 13 | Page | 1380 0C | | | | | | |
|---|---|---|---|---|---|---|---|---|---|---|---|---|---|---|---|---|
| No Cells | 1 | | Active area | | 20 | cm2 | Thick | | 2.5 | mm | per cell | | Flow = | Cathode to anode | | |
| Refer to Figure 5 and Tables 1a, 1b | | | | | | | | | | | | | | | | |
| Item | 1 / 2 | 3 | 4 | 5 | 6 | 7 | 8 | 9 | 10 | 11 | 12 | 13 | 14 | 15 | 16 | 17 |
| Code | K1 | G1 | G1 | G3 b | G3 b | A5 b | None | D4 | C16 | S8 | S13 | S8 | A5 b | None | D4 | None |

| Time | Op time | Current | Voltage | | Gas | Liquid | Temp | Pressure | | | Power | Specific power | Power density | | |
|---|---|---|---|---|---|---|---|---|---|---|---|---|---|---|---|
| hour. | minute | minute | A | V Eoc | V Eop | S L/min | ml/min 1M/1M OH/HCO2 | K | kPa(abs) IN | OUT | | W | kW/m2 | kW/L | | |
| Begin run | | | | | | | | | | | | | | | | |
| 15 | 21 | | | | | AIR | No-back-pressure | | | | | | | | | |
| 15 | 21 | 0 | 0.00 | 0.80 | | 1.0 | 6 | 25 | 150 | 100 | | | | | | |
| 15 | 28 | 7 | 0.00 | 0.80 | | 1.0 | 6 | 26 | 150 | 100 | | | | | | |
| 15 | 30 | 9 | 1.60 | | 0.24 | 1.0 | 6 | 26 | 150 | 100 | | 0.38 | 0.19 | 0.08 | | |
| 15 | 58 | 37 | 2.20 | | 0.25 | 2.0 | 6 | 35 | 190 | 100 | | 0.55 | 0.28 | 0.11 | | |
| 16 | 55 | 94 | 2.30 | | 0.26 | 2.0 | 6 | 30 | 190 | 100 | | 0.60 | 0.30 | 0.12 | | |
| 16 | 55 | 94 | 2.30 | | 0.26 | 3.0 | 2 | 60 | 220 | 100 | | 0.60 | 0.30 | 0.12 | | |
| 16 | 58 | 97 | 0.00 | 0.82 | | 3.0 | 2 | 60 | 220 | 100 | | | | | | |
| 16 | 59 | 98 | 4.10 | | 0.46 | 3.0 | 2 | 60 | 220 | 100 | | 1.89 | 0.94 | 0.38 | | |
| 17 | 0 | 99 | 4.00 | | 0.47 | 3.0 | 2 | 60 | 220 | 100 | | 1.88 | 0.94 | 0.38 | | |
| 17 | 6 | 105 | 0.00 | 0.83 | | 2.0 | 4 | 61 | 220 | 100 | | | | | | |
| | | | | | | OXYGEN | No back-pressure | | | | | | | | | |
| 17 | 9 | 108 | 0.00 | 0.83 | | 2.0 | 4 | 61 | 220 | 100 | | | | | | |
| 17 | 10 | 109 | 4.40 | | 0.51 | 2.0 | 4 | 61 | 220 | 100 | | 2.24 | 1.12 | 0.45 | | |
| 17 | 11 | 110 | 4.30 | | 0.54 | 2.0 | 4 | 61 | 220 | 100 | | 2.32 | 1.16 | 0.46 | | |
| | | | | | | OXYGEN | With back-pressure | | | | | | | | | |
| 17 | 15 | 114 | 0.00 | 0.82 | | 1.0 | 4 | 60 | 230 | 200 | | | | | | |
| 17 | 17 | 116 | 4.40 | | 0.48 | 1.0 | 4 | 60 | 230 | 200 | | 2.11 | 1.06 | 0.42 | | |
| 17 | 20 | 119 | 4.50 | | 0.48 | 1.0 | 4 | 60 | 230 | 200 | | 2.16 | 1.08 | 0.43 | | |

FIG. 6

Experiment 7

| Run No. | 510 | | Date | 9-Dec | 2008 | Lab bk | | 13 | Page | 137984 | | | | | | |
|---|---|---|---|---|---|---|---|---|---|---|---|---|---|---|---|---|
| No Cells | 1 | | Active area | | 20 | cm2 | Thick | | 2.4 mm | | per cell | | Flow = | Cathode to anode | | |
| Refer to Figure 5 and Tables 1a, 1b | | | | | | | | | | | | | | | | |
| Item | 1/2 | 3 | 4 | 5 | 6 | 7 | 8 | 9 | 10 | 11 | 12 | 13 | 14 | 15 | 16 | 17 |
| Code | K1 | G1 | G1 | G3 a | G3 a | A2 | None | D4 | C18 | S9 | S13 | S9 | A5 b | None | D4 | A2 |

| Time hour. | Op time minute | Current minute | Voltage A | V Eoc | V Eop | Gas S L/min | Liquid ml/min 1M/1M OH/HCO2 | Temp K | Pressure kPa(abs) OUT | IN | OUT | Power W | Specific power kW/m2 | Power density kW/L |
|---|---|---|---|---|---|---|---|---|---|---|---|---|---|---|
| Begin run | | | | | | | | | | | | | | |
| 18 | 5 | | | | | | AIR | | No-back-pressure | | | | | |
| 18 | 5 | 0 | 0.00 | | | 1.0 | | 6 | 25 | 120 | 100 | | | |
| 18 | 7 | 2 | 0.97 | | 0.08 | 2.0 | | 6 | 25 | 120 | 100 | 0.08 | 0.04 | 0.02 |
| 18 | 10 | 5 | 0.99 | | 0.08 | 2.0 | | 6 | 25 | 120 | 100 | 0.08 | 0.04 | 0.02 |
| 18 | 15 | 10 | 0.00 | 0.73 | | 2.0 | | 6 | 25 | 120 | 100 | | | |
| 18 | 17 | 12 | 1.10 | | 0.09 | 3.0 | | 6 | 25 | 150 | 100 | 0.10 | 0.05 | 0.02 |
| 18 | 30 | 25 | 1.25 | | 0.10 | 3.0 | | 6 | 30 | 150 | 100 | 0.13 | 0.06 | 0.03 |
| 18 | 40 | 35 | 1.58 | | 0.13 | 3.0 | | 6 | 35 | 150 | 100 | 0.21 | 0.10 | 0.04 |
| 18 | 44 | 39 | 1.90 | | 0.16 | 3.0 | | 6 | 40 | 150 | 100 | 0.30 | 0.15 | 0.06 |
| 18 | 50 | 45 | 2.09 | | 0.17 | 3.0 | | 6 | 45 | 150 | 100 | 0.36 | 0.18 | 0.07 |
| 18 | 55 | 50 | 2.23 | | 0.19 | 3.0 | | 6 | 50 | 150 | 100 | 0.41 | 0.21 | 0.09 |
| 19 | 0 | 55 | 2.33 | | 0.19 | 3.0 | | 6 | 55 | 150 | 100 | 0.45 | 0.23 | 0.09 |
| 19 | 6 | 61 | 2.40 | | 0.20 | 3.0 | | 6 | 60 | 150 | 100 | 0.48 | 0.24 | 0.10 |
| 19 | 14 | 69 | 2.44 | | 0.20 | 3.0 | | 6 | 65 | 150 | 100 | 0.50 | 0.25 | 0.10 |
| 19 | 24 | 79 | 2.46 | | 0.20 | 3.0 | | 6 | 70 | 150 | 100 | 0.50 | 0.25 | 0.10 |
| 19 | 25 | 80 | 2.42 | | 0.20 | 3.0 | | 6 | 73 | 160 | 100 | 0.49 | 0.25 | 0.10 |
| 19 | 41 | 96 | 2.40 | | 0.20 | 3.0 | | 6 | 75 | 160 | 100 | 0.48 | 0.24 | 0.10 |
| 19 | 45 | 100 | 0.00 | 0.79 | | 3 | | 6 | 75 | 160 | 100 | | | |
| | | | | | | OXYGEN | | | No back-pressure | | | | | |
| 19 | 47 | 102 | 0.00 | 0.78 | | 3.0 | | 6 | 75 | 160 | 100 | | | |
| 19 | 48 | 103 | 2.75 | | 0.26 | 3.0 | | 6 | 75 | 160 | 100 | 0.72 | 0.36 | 0.15 |
| 19 | 49 | 104 | 2.85 | | 0.26 | 3.0 | | 6 | 76 | 160 | 100 | 0.74 | 0.37 | 0.15 |
| 19 | 50 | 105 | 2.90 | | 0.27 | 3.0 | | 6 | 76 | 160 | 100 | 0.78 | 0.39 | 0.16 |

FIG. 8

Experiment 8

| Run No | 568 | | Date | 17-Apr | 2009 Lab bk | | 15 Page | 136468 | | | | | | | | |
|---|---|---|---|---|---|---|---|---|---|---|---|---|---|---|---|---|
| No Cells | 1 | | Active area | | 20 cm2 | Thick | | 3.8 mm | per cell | | Flow = | Cathode to anode | | | | |
| Refer to Figure 5 and Tables 1a, 1b | | | | | | | | | | | | | | | | |
| Item | 1/2 | 3 | 4 | 5 | 6 | 7 | 8 | 9 | 10 | 11 | 12 | 13 | 14 | 15 | 16 | 17 |
| Code | K1 | G2 | G2 | G4 | G4 | A5 a | D5 | D4 | C13 a | S14 | S13+2S11 S14 | | A5 a | D5 | D4 | C13 a |

| Time | | Op time | Current | Voltage | | Gas | Liquid | Temp | Pressure | | Power | Specific power | Power density |
|---|---|---|---|---|---|---|---|---|---|---|---|---|---|
| hour. | minute | minute | A | Ecc | Eop | S L/min | ml/min | K | kPa(abs) | | W | kW/m2 | kW/L |
| | | | | V | V | | 4M/4M | OUT | IN | OUT | | | |
| Begin run | | | | | | | OH/HCO2 | | | | | | |
| 14 | 12 | | | | | AIR | No-back-pressure | | | | | | |
| 14 | 12 | 0 | 0.00 | 0.87 | | 0 | 0 | 25 | 100 | 100 | | | |
| 14 | 24 | 12 | 0.00 | 0.84 | | 2.0 | 3 | 25 | 130 | 100 | | | |
| 14 | 45 | 33 | 2.30 | | | 0.16 | 2.0 | 3 | 25 | 130 | 100 | 0.37 | 0.18 | 0.05 |
| 15 | 0 | 48 | 2.80 | | | 0.20 | 2.0 | 3 | 30 | 130 | 100 | 0.56 | 0.28 | 0.07 |
| 15 | 3 | 51 | 0.00 | 0.835 | | | 2.0 | 3 | 30 | 130 | 100 | | | |
| 15 | 12 | 60 | 3.05 | | | 0.22 | 2.0 | 3 | 35 | 130 | 100 | 0.67 | 0.34 | 0.09 |
| 15 | 17 | 65 | 0.00 | 0.84 | | | 2.0 | 3 | 36 | 130 | 100 | | | |
| 15 | 21 | 69 | 3.30 | | | 0.25 | 2.0 | 3 | 48 | 130 | 100 | 0.83 | 0.41 | 0.11 |
| 15 | 29 | 77 | 3.40 | | | 0.26 | 2.0 | 4 | 51 | 130 | 100 | 0.88 | 0.44 | 0.12 |
| 15 | 35 | 83 | 3.30 | | | 0.25 | 2.0 | 3.5 | 55 | 130 | 100 | 0.83 | 0.41 | 0.11 |
| 15 | 38 | 86 | 3.50 | | | 0.26 | 2.0 | 2 | 56 | 130 | 100 | 0.91 | 0.46 | 0.12 |
| 15 | 41 | 89 | 0.00 | 0.83 | | | 2.0 | 2 | 56 | 130 | 100 | | | |
| 15 | 43 | 91 | 3.75 | | | 0.28 | 3.0 | 2 | 57 | 130 | 100 | 1.05 | 0.53 | 0.14 |
| | | | | | | OXYGEN | No back-pressure | | | | | | |
| 15 | 45 | 93 | 0.00 | 0.85 | | | 2.0 | 2 | 57 | 130 | 100 | | | |
| 15 | 49 | 97 | 4.80 | | | 0.38 | 2.0 | 2 | 57 | 130 | 100 | 1.82 | 0.91 | 0.24 |
| 15 | 56 | 104 | 5.00 | | | 0.37 | 2.0 | 6.5 | 49 | 140 | 100 | 1.85 | 0.93 | 0.24 |
| 15 | 58 | 106 | 5.20 | | | 0.38 | 2.0 | 6.5 | 50 | 140 | 100 | 1.98 | 0.99 | 0.26 |
| 16 | 3 | 111 | 0.00 | 0.85 | | | 2.0 | 6.5 | 52 | 140 | 100 | | | |
| 16 | 4 | 112 | 5.3 | | | 0.39 | 2.0 | 6.5 | 52 | 140 | 100 | 2.07 | 1.03 | 0.27 |
| 16 | 9 | 117 | 5.4 | | | 0.40 | 2.0 | 6.5 | 55 | 140 | 100 | 2.16 | 1.08 | 0.28 |
| 16 | 16 | 124 | 0 | 0.85 | | | 2.0 | 6.5 | 56 | 140 | 100 | | | |
| 16 | 17 | 125 | 5.45 | | | 0.41 | 2.0 | 6.5 | 56 | 140 | 100 | 2.21 | 1.10 | 0.29 |
| 16 | 20 | 128 | 5.5 | | | 0.41 | 2.0 | 6.5 | 56 | 140 | 100 | 2.26 | 1.13 | 0.30 |
| 16 | 22 | 130 | 5.37 | | | 0.39 | 2.0 | 6.5 | 57 | 140 | 100 | 2.09 | 1.05 | 0.28 |
| 16 | 25 | 133 | 0 | 0.85 | | | 2.0 | 6.5 | 60 | 140 | 100 | | | |
| 16 | 26 | 134 | 5.2 | | | 0.40 | 2.0 | 6.5 | 60 | 140 | 100 | 2.08 | 1.04 | 0.27 |
| | | | | | | OXYGEN | With back-pressure | | | | | | |
| 16 | 31 | 139 | 5.35 | | | 0.41 | 2.0 | 3 | 60 | 220 | 205 | 2.19 | 1.10 | 0.29 |
| 16 | 35 | 143 | 5.6 | | | 0.41 | 2.0 | 3 | 61 | 220 | 205 | 2.30 | 1.15 | 0.30 |
| | | | | | | OXYGEN | No back-pressure | | | | | | |
| 17 | 18 | 186 | 4 | | | 0.30 | 2.0 | 3 | 70 | 130 | 100 | 1.20 | 0.60 | 0.16 |

FIG. 10

Experiment 9

| Run No | 611 | | Date | 26-Jun | 2009 Lab bk | | 16 Page | 136448 | | | | | | | | |
|---|---|---|---|---|---|---|---|---|---|---|---|---|---|---|---|---|
| No Cells | 1 | | Active area | | 20 cm2 | Thick | | 3.8 mm | per cell | | Flow = | Cathode to anode | | | | |
| Refer to Figure 5 and Tables 1a, 1b | | | | | | | | | | | | | | | | |
| Item | 1/2 | 3 | 4 | 5 | 6 | 7 | 8 | 9 | 10 | 11 | 12 | 13 | 14 | 15 | 16 | 17 |
| Code | K1 | G2 | G2 | G4 | G4 | A5b | D5 | D4 | C13a | S19 | S13+2S18 | None | A5b | D5 | D4 | C13a |

| Time hour | Op time minute | Current minute A | Voltage Eoc V | Eop V | Gas S L/min | Liquid ml/min 1M/1M OH/HCO2 | Temp K | Pressure kPa(abs) OUT IN | | OUT | Power W | Specific power kW/m2 | Power density kW/L |
|---|---|---|---|---|---|---|---|---|---|---|---|---|---|
| Begin run | | | | | | | | | | | | | |
| 12 | 48 | | | | AIR | No back pressure | | | | | | | |
| 12 | 48 | 0 | 0 | 0.84 | 0 | 0 | 25 | 0 | | 0 | | | |
| 12 | 51 | 3 | 0 | 0.8 | | 2.0 | 10 | 25 | 130 | 100 | | | |
| 12 | 53 | 5 | 2.52 | | 0.27 | 2.0 | 10 | 26 | 130 | 100 | 0.68 | 0.34 | 0.09 |
| 12 | 55 | 7 | 2.62 | | 0.275 | 2.0 | 10 | 27 | 130 | 100 | 0.72 | 0.36 | 0.09 |
| 13 | 3 | 15 | 2.9 | | 0.29 | 2.0 | 10 | 30 | 130 | 100 | 0.84 | 0.42 | 0.11 |
| 13 | 11 | 23 | | 0.81 | | 2.0 | 10 | 35 | 130 | 100 | | | |
| 13 | 12 | 24 | 3.2 | | 0.32 | 2.0 | 10 | 35 | 130 | 100 | 1.02 | 0.51 | 0.13 |
| 13 | 14 | 26 | 3.32 | | 0.33 | 2.0 | 10 | 36 | 130 | 100 | 1.10 | 0.55 | 0.14 |
| 13 | 17 | 29 | 3.52 | | 0.34 | 2.0 | 10 | 40 | 130 | 100 | 1.20 | 0.60 | 0.16 |
| 13 | 23 | 35 | | 0.826 | | 2.0 | 10 | 45 | 130 | 100 | | | |
| 13 | 24 | 36 | 3.62 | | 0.36 | 2.0 | 10 | 45 | 130 | 100 | 1.30 | 0.65 | 0.17 |
| 13 | 29 | 41 | 3.77 | | 0.37 | 2.0 | 10 | 50 | 130 | 100 | 1.39 | 0.70 | 0.18 |
| 13 | 35 | 47 | | 0.837 | | 2.0 | 10 | 55 | 130 | 100 | | | |
| 13 | 38 | 50 | 3.9 | | 0.38 | 2.0 | 10 | 57 | 130 | 100 | 1.48 | 0.74 | 0.20 |
| 13 | 42 | 54 | 3.9 | | 0.38 | 2.0 | 10 | 60 | 130 | 100 | 1.48 | 0.74 | 0.20 |
| 13 | 52 | 64 | | 0.844 | | 2.0 | 10 | 65 | 130 | 100 | | | |
| 13 | 53 | 65 | 3.8 | | 0.38 | 2.0 | 10 | 65 | 130 | 100 | 1.44 | 0.72 | 0.19 |
| 13 | 56 | 68 | 3.75 | | 0.38 | 2.0 | 10 | 65 | 130 | 100 | 1.43 | 0.71 | 0.19 |
| 13 | 59 | 71 | 3.75 | | 0.385 | 2.0 | 10 | 67 | 130 | 100 | 1.44 | 0.72 | 0.19 |
| 14 | 4 | 76 | 3.75 | | 0.38 | 2.0 | 10 | 70 | 130 | 100 | 1.43 | 0.71 | 0.19 |
| 14 | 15 | 87 | | 0.85 | | 2.0 | 10 | 72 | 130 | 100 | | | |
| 14 | 18 | 90 | 3.58 | | 0.375 | 2.0 | 10 | 73 | 130 | 100 | 1.34 | 0.67 | 0.18 |
| 14 | 22 | 94 | 3.65 | | 0.37 | 2.0 | 10 | 75 | 130 | 100 | 1.35 | 0.68 | 0.18 |
| | | | | | OXYGEN | | No back-pressure | | | | | | |
| 14 | 24 | 96 | 4.8 | | 0.48 | 2.0 | 15 | 77 | 130 | 100 | 2.30 | 1.15 | 0.30 |
| 14 | 26 | 98 | 4.88 | | 0.488 | 2.0 | 15 | 75 | 130 | 100 | 2.38 | 1.19 | 0.31 |
| 14 | 27 | 99 | 4.86 | | 0.488 | 2.0 | 15 | 76 | 130 | 100 | 2.37 | 1.19 | 0.31 |
| 14 | 29 | 101 | 4.9 | | 0.487 | 1.5 | 15 | 77 | 130 | 100 | 2.39 | 1.19 | 0.31 |
| 14 | 31 | 103 | | 0.85 | | 1.5 | 15 | 350 | 130 | 100 | | | |
| | | | | | OXYGEN | | With back-pressure | | | | | | |
| 14 | 35 | 107 | | 0.85 | | 1.5 | 15 | 75 | 220 | 205 | | | |
| 14 | 35 | 107 | 4.7 | | 0.5 | 1.5 | 15 | 75 | 220 | 205 | 2.35 | 1.18 | 0.31 |
| 14 | 36 | 108 | 4.8 | | 0.51 | 1.5 | 15 | 75 | 220 | 205 | 2.45 | 1.22 | 0.32 |
| 14 | 37 | 109 | 4.84 | | 0.51 | 1.5 | 15 | 75 | 220 | 205 | 2.47 | 1.23 | 0.32 |
| 14 | 40 | 112 | 4.82 | | 0.51 | 1.0 | 15 | 74 | 220 | 205 | 2.46 | 1.23 | 0.32 |
| 14 | 43 | 115 | 4.85 | | 0.505 | 1.0 | 15 | 72 | 220 | 205 | 2.45 | 1.22 | 0.32 |
| 14 | 46 | 118 | 4.85 | | 0.502 | 1.0 | 15 | 72 | 220 | 205 | 2.43 | 1.22 | 0.32 |
| 14 | 50 | 122 | 4.82 | | 0.5 | 1.0 | 15 | 72 | 220 | 205 | 2.41 | 1.21 | 0.32 |

FIG. 12

Experiment 10

| Run No | 617 | | Date | 3-Jul | 2009 | Lab bk | 17 | Page | 144758 | | | | | | | |
|---|---|---|---|---|---|---|---|---|---|---|---|---|---|---|---|---|
| No Cells | 1 | | Active area | | 15 | cm2 | Thick | | 3.8 mm | per cell | | Flow = | Cathode to anode | | | |
| Refer to Figure 5 and Tables 1a, 1b | | | | | | | | | | | | | | | | |
| Item | 1/2 | 3 | 4 | 5 | 6 | 7 | 8 | 9 | 10 | 11 | 12 | 13 | 14 | 15 | 16 | 17 |
| Code | K1 | G2 | G2 | G4 | G4 | A5 b | D5 | D4 | C13 a | S20 | S13+2S18 | None | A5 b | D5 | D4 | C13 a |

| Time hour. | Op time minute | Current minute A | Voltage Eoc V | Eop V | Gas S L/min | Liquid ml/min 1M/1M OH/HCO2 | Temp oC OUT | Pressure kPa(abs) IN | OUT | Power W | Specific power kW/m2 | Power density kW/L |
|---|---|---|---|---|---|---|---|---|---|---|---|---|
| Begin run | | | | | | | | | | | | |
| 17 | 0 | | | | AIR | No back-pressure | | | | | | |
| 17 | 0 | 0 | 0.801 | | | 0 | 25 | 0 | 0 | | | |
| 17 | 3 | 3 | 0.778 | | 2.0 | 10 | 26 | 130 | 100 | | | |
| 17 | 8 | 8 | 1.66 | 0.131 | 2.0 | 10 | 26 | 130 | 100 | 0.22 | 0.14 | 0.04 |
| 17 | 14 | 14 | 1.76 | 0.138 | 2.0 | 10 | 30 | 130 | 100 | 0.24 | 0.16 | 0.04 |
| 17 | 20 | 20 | 0.79 | | 2.0 | 10 | 35 | 130 | 100 | | | |
| 17 | 25 | 25 | 2.44 | 0.19 | 2.0 | 10 | 40 | 130 | 100 | 0.46 | 0.31 | 0.08 |
| 17 | 31 | 31 | 0.805 | | 2.0 | 10 | 45 | 130 | 100 | | | |
| 17 | 37 | 37 | 2.9 | 0.23 | 2.0 | 10 | 50 | 130 | 100 | 0.67 | 0.44 | 0.12 |
| 17 | 41 | 41 | 0.811 | | 2.0 | 10 | 50 | 130 | 100 | | | |
| 17 | 43 | 43 | 0.815 | | 2.0 | 10 | 55 | 130 | 100 | | | |
| 17 | 45 | 45 | 3.16 | 0.25 | 2.0 | 10 | 56 | 130 | 100 | 0.79 | 0.53 | 0.14 |
| 18 | 2 | 62 | 0.825 | | 2.0 | 10 | 65 | 130 | 100 | | | |
| 18 | 3 | 63 | 3.27 | 0.27 | 2.0 | 10 | 66 | 130 | 100 | 0.88 | 0.59 | 0.15 |
| 18 | 12 | 72 | 3.32 | 0.27 | 2.0 | 10 | 70 | 130 | 100 | 0.90 | 0.60 | 0.16 |
| 18 | 24 | 84 | 3.36 | 0.28 | 2.0 | 10 | 73 | 130 | 100 | 0.94 | 0.63 | 0.17 |
| 18 | 36 | 96 | 0.824 | | 2.0 | 10 | 75 | 130 | 100 | | | |
| 18 | 39 | 99 | 3.34 | 0.275 | 2.0 | 10 | 76 | 130 | 100 | 0.92 | 0.61 | 0.16 |
| | | | | | OXYGEN | No back-pressure | | | | | | |
| 18 | 40 | 100 | 4.35 | 0.35 | 2.0 | 15 | 76 | 130 | 100 | 1.52 | 1.02 | 0.27 |
| 18 | 44 | 104 | 4.35 | 0.36 | 2.0 | 15 | 77 | 130 | 100 | 1.57 | 1.04 | 0.27 |
| 18 | 49 | 109 | 0.28 | 0.73 | 2.0 | 15 | 77 | 130 | 100 | 0.20 | 0.14 | 0.04 |
| | | | | | OXYGEN | With back-pressure | | | | | | |
| 18 | 54 | 114 | 4.3 | 0.37 | 2.0 | 15 | 72 | 220 | 205 | 1.59 | 1.06 | 0.28 |
| 18 | 58 | 118 | 4.45 | 0.37 | 1.0 | 30 | 72 | 220 | 205 | 1.65 | 1.10 | 0.29 |

FIG. 14

MIXED REACTANT FLOW-BY FUEL CELL

CROSS REFERENCE TO RELATED APPLICATIONS

This is the U.S. National Stage of International Application No. PCT/CA2009/001116, filed Aug. 7, 2009, which in turn claims the benefit of U.S. Provisional Application No. 61/136,034, filed Aug. 7, 2008. Both applications are incorporated herein by reference in their entirety.

FIELD OF THE INVENTION

This invention relates generally to fuel cells, and particularly to fuel cells using a mixed reactant fluid comprising fuel and oxidant.

BACKGROUND OF THE INVENTION

A conventional fuel cell comprises at least one anode/cathode electrochemical couple separated by an ionic conductor, with fuel and oxidant streams fed separately and respectively to the anode and the cathode via dedicated flow fields that are in electronic contact with each electrode. In the conventional jargon the term "fuel cell" is used for both a single anode/cathode couple (also called a "cell" or more specifically a "unit cell") and to a multi-cell stack that is usually configured to operate in a bipolar mode, with the individual unit cells electronically connected in series. Monopolar operation of a multi-cell stack, with individual unit cells electronically connected in parallel, is known but not normally practiced.

In a conventional bipolar fuel cell stack, fuel and oxidant streams are fed separately (dual feed) into the fuel cell via flow fields in bipolar plates that physically isolate the fuel and oxidant streams. In polymer electrolyte membrane (PEM) type fuel cells, a polymer electrolyte membrane separator is located in the fuel cell between the anode and cathode to permit ionic transport between the anode and cathode, while preventing electronic communication through the membrane between the electrodes and limiting or preventing so-called crossover of the fuel and/or oxidant from one anodic or cathodic compartment of the fuel cell to the other anodic or cathodic compartment. The separate feeds and bipolar plates add complexity, cost and size to the fuel cells and auxiliary equipment (i.e. the so-called "balance of plant" that supports the fuel cell operation), which serves as a limitation on cost/performance metrics in conventional fuel cells.

SUMMARY OF THE INVENTION

It is an object of the present invention to provide a new and useful improvement over fuel cells in the prior art.

According to one aspect of the invention there is provided a cell unit of a mixed reactant fuel cell comprising a multiphase mixed reactant fluid distributor, an anode and cathode in fluid and electronic communication with the distributor, and a separator positioned relative to one of the anode and the cathode to provide electronic insulation and ionic communication between the cell unit and another adjacent cell unit. The distributor is electronically conductive and the reactant fluid which flows through the distributor has fuel and oxidant each in separate fluid phases, wherein at least one of the fuel and oxidant fluid phases is a liquid. A capillary pressure at the anode is selected to produce a higher hold up of the fuel fluid phase than the oxidant fluid phase in the pores of the anode when the mixed reactant fluid flows through the distributor thereby suppressing transfer of oxidant to the anode from the distributor, or a capillary pressure at the cathode is selected to produce a higher hold up of the oxidant fluid phase than the fuel fluid phase in the pores of the cathode when the mixed reactant fluid flows through the distributor, thereby suppressing transfer of fuel to the cathode from the distributor; or both. The distributor extends between respective superficial electrode surfaces of the anode and cathode such that the bulk mixed reactant fluid flows through the distributor and by the superficial electrode surfaces under conditions that produce a positive net potential of the fuel cell under load. A fuel cell stack can be formed comprising at least two of the above referenced cell units in adjacent contact with each other.

The fuel phase can be aqueous in which case the anode is hydrophilic. The oxidant phase can be a gas and the cathode can be hydrophobic. The distributor can have poor or no catalytic activity with respect to the fuel and oxidant under fuel cell operating conditions. The separator can be intrinsically ionically non-conductive in which case is wettable by an electrolyte solution in the mixed reactant fluid. Further, the distributor can be resistant to wetting by the electrolyte solution.

According to another aspect of the invention, there is provided a mixed reactant fuel cell comprising an electronically conductive first distributor for flowing therethrough a multiphase mixed reactant fluid having fuel and oxidant each in separate fluid phases, wherein at least one of the fuel and oxidant fluid phases is a liquid; an anode in fluid and electronic communication with the first distributor; an electronically conductive second distributor for flowing therethrough the multiphase mixed reactant fluid; a cathode in fluid and electronic communication with the second distributor; and a fluid separator positioned between the anode and cathode to provide electronic insulation and ionic communication therebetween. A capillary pressure at the anode is selected to produce a higher hold-up of the fuel fluid phase than the oxidant fluid phase in pores of the anode when the mixed reactant fluid flows through the distributor thereby suppressing transfer of oxidant to the anode from the distributor; or, a capillary pressure at the cathode is selected to produce a higher hold-up of the oxidant fluid phase than the fuel fluid phase in pores of the cathode when the mixed reactant fluid flows through the distributor, thereby suppressing transfer of fuel to the cathode from the distributor; or both.

In the aforementioned cell unit and fuel cell, the anode, cathode, distributor and separator can be interconnected concentric cylindrical or spiral would structures surrounding a central mandrel for receiving the mixed reactant fluid.

In the aforementioned cell unit or fuel cell stack, one fluid phase can be an ionic conductor in which case the other fluid phase is an ionic insulator, and the flow of each fluid phase can be controlled to disperse the ionically conductive phase in the distributor and suppress ionic conduction through the distributor. In particular, the volumetric flow ratio of the ionic insulator fluid phase to the ionic conductor fluid phase can be in the range about 10 to about 1000.

These aspects of the present invention allow for fuel cell designs that are of lower cost with reduced system complexity, and provide for the manufacture of thinner and lighter fuel cell stacks with the potential for greater volumetric power densities over conventional bipolar fuel cell stacks.

DESCRIPTION OF FIGURES

FIGS. 6 and 7 are a data table and a graph of test conditions and results of the sixth experiment.

FIGS. 8 and 9 are a data table and a graph of test conditions and results of the seventh experiment.

FIGS. 10 and 11 are a data table and a graph of test conditions and results of the eighth experiment.

FIGS. 12 and 13 are a data table and a graph of test conditions and results of the ninth experiment.

FIGS. 14 and 15 are a data table and a graph of test conditions and results of the tenth experiment.

DETAILED DESCRIPTION OF EMBODIMENTS OF THE INVENTION

Figure 1A:
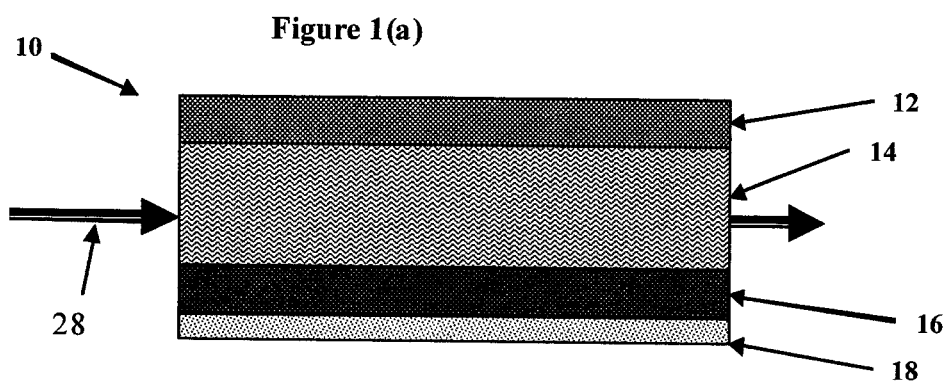
FIG. 1 is a schematic representation of components of a mixed reactant flow-by fuel cell showing in FIG. 1(a) a cell unit with flow-by mixed reactants and in FIG. 1(b) a unit cell with flow-by mixed reactants, arranged as a single monopolar fuel cell.

The embodiments described herein relate to multiphase mixed reactant fuel cells, i.e. fuel cells that receive both fuel and oxidant mixed together in a single fluid stream, wherein the fuel and oxidant are each in separate fluid phases. Separate fluid phases as used in this description means at least two generally immiscible fluids, and include liquid fuel phase and gaseous oxidant phase, gaseous fuel phase and liquid oxidant phase, and liquid fuel phase and liquid oxidant phase. It should be understood that the term "generally immiscible" means a fluid that is generally considered to be immiscible in another fluid but can still have trace amounts of the fluid dissolved in the other fluid. For example, there tends to be some unavoidable solubility of oxidant in fuel phase and/or fuel in oxidant phase after they contact each other for certain liquid fuels and gaseous oxidants, such as a few mM $O_2$ in aqueous sodium formate.

General Structure

Generally speaking, the described embodiments relate to a multiphase mixed reactant fuel cell having a cell unit comprising the following major components: a mixed reactant distributor for flowing therethough a multiphase mixed reactant fluid having fuel and oxidant each in separate fluid phases; an anode in fluid communication with the distributor and having physical properties selected to produce a higher fuel phase hold-up than oxidant phase hold-up when the mixed reactant fluid flows through the distributor (i.e. in the direction of bulk mixed reactant fluid flow) thereby suppressing transfer of oxidant to the anode from the distributor; a cathode in fluid communication with the distributor and having physical properties selected to produce a higher oxidant fluid phase hold-up than fuel fluid phase hold-up when the mixed reactant fluid flows through the distributor thereby suppressing transfer of fuel to the cathode from the distributor; and a separator positioned relative to one of the anode and the cathode to provide electronic isolation and ionic communication between the cell unit and another adjacent cell unit. The distributor extends between respective superficial electrode surfaces of the anode and cathode such that the mixed reactant fluid flowing through the distributor flows by the electrode surfaces under conditions that produce a positive net potential of the fuel cell under load, i.e. in operation delivering electric power to an external electrical load.

As used in this description, "hold-up" refers to the volume fraction of a specified fluid phase in the pore space of a specified component. By designing the anode and cathode to have a higher hold-up of their associated reactant (fuel for anode, oxidant for cathode) than of the other reactant, partial separation of the reactant fluids occur in the mixed reactant stream during fuel cell operation and the fuel will tend to move to the anode and the oxidant will tend to move to the cathode, thereby enhancing fuel cell performance with mixed reactants.

A cell unit 10 according to one embodiment of the invention is shown in FIG. 1(a). The cell unit 10 comprises an anode 12, a distributor 14 adjacent to and in contact with the anode 12, a cathode 16 adjacent to and in contact with the distributor 14, and a fluid separator 18, which in the cell unit 10 depicted in FIG. 1(a) is shown adjacent to and in contact with the cathode 16, although the separator 18 can optionally be adjacent to and in contact with the anode 12 (in which case, an adjacent cell unit will have its cathode positioned adjacent to and in contact with the separator 18).

Figure 1B:
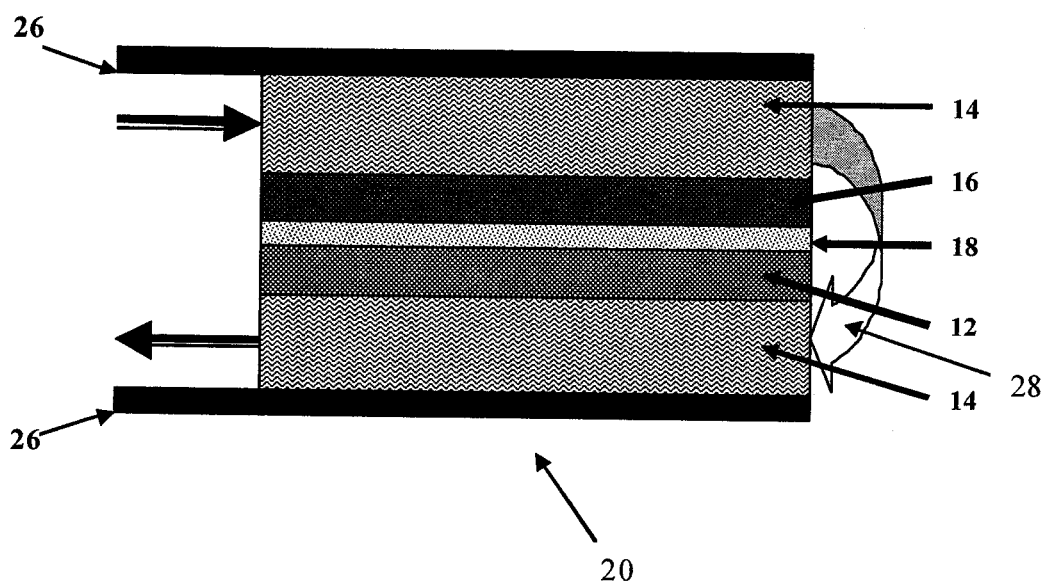

The distributor 14 is a porous and electronically conductive structure and serves to receive and flow therethrough a multiphase mixed reactant fluid stream 28 through the distributor 14 (in the direction of the arrows shown in FIGS. 1(a) and 1(b)). For example, the mixed reactant fluid stream can comprise an aqueous fuel such as aqueous sodium formate and a gaseous oxidant such as oxygen in air. The anode 12 is a porous solid layer which is in fluid and electronic communication with the distributor 14. The cathode 16 is also a porous solid layer that is in fluid and electronic communication with the distributor 14. The pores of the distributor 14, anode 12, and cathode 16 have interconnected voids to allow a fluid to flow through these components under the influence of a pressure gradient. The separator 18 provides electronic insulation and ionic communication through its thickness, i.e. between the cell unit 10 and an adjacent cell unit (not shown). In some embodiments, the separator structure is intrinsically ionically conductive; in other embodiments, the separator structure is not intrinsically ionically conductive, and in such cases the mixed reactant fluid of fuel and oxidant can include an electrolyte which wets the separator 18. Optionally or additionally, the fuel or oxidant may act as electrolyte in cases where the separator structure is not intrinsically ionically conductive.

The components 12, 14, 16, 18 as shown in FIG. 1(a) can be separate and distinct pieces assembled to form the cell unit 10. Alternatively, some of the components (such as the anode 12, cathode 16 and distributor 14) can be fabricated from a single piece or module, for use in a compact modular cell configuration. For example, the anode 12, distributor 14 and the cathode 16 could be fabricated together into a single module. One possible configuration is a ca. 2 mm thick metal (eg. nickel) open-cell foam sheet with the anode 12 and cathode 16 pasted or painted into opposite faces (each say 0.2 mm thick) and the centre 1.6 mm portion serving as the distributor 14 for fluid flow therethrough. A compact modular configuration provides a means to reduce contact resistance between certain components of the fuel cell 20, and also to simplify the assembly of multi-cell reactors.

The components of FIG. 1(a) may be arranged into a single fuel cell 20, or unit cell as shown in FIG. 1(b) where each unit cell 20 is defined by the anode 12, the cathode 16 of the corresponding electrochemical couple, the separator 18 sandwiched between the anode 12 and cathode 16, and a pair of the distributors 14 each in adjacent contact with the anode 12 and the cathode 16 respectively.

Figure 2:
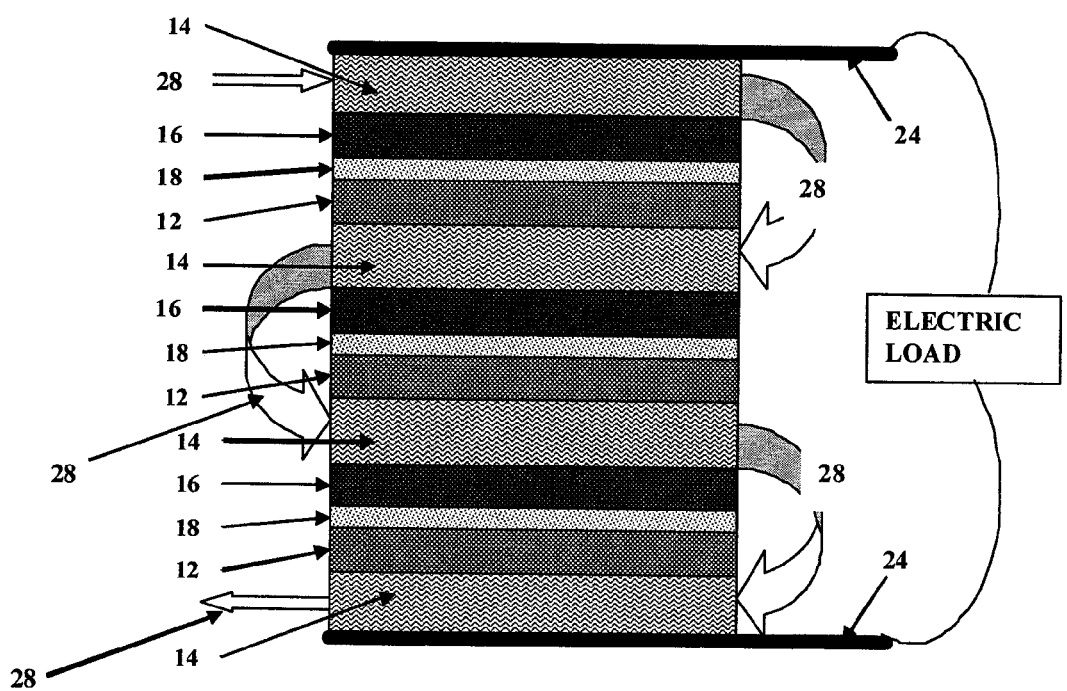
FIG. 2 is a schematic representation of a mixed reactant, flow-by fuel cell stack comprising three unit cells.

Cell units 10 can be stacked together to form a stack of unit cells 20, such as the three fuel cell stack 22 as shown in FIG. 2.

Each of the components of the unit cell 20 should be selected to possess certain desired properties that enable each component to achieve their intended function. The anode properties are selected so that the anode 12 is electronically conductive, porous, and electrocatalytic for fuel oxidation. The cathode properties are selected so that the cathode 16 is electronically conductive, porous, and electrocatalytic for oxidant reduction. As will be discussed in more detail below, the anode and cathode properties are further selected so as to produce a higher hold-up of fuel phase than oxidant phase in the anode and a higher hold up of oxidant phase than fuel phase in the cathode. The distributor properties are selected so that the distributor 14 is electronically conductive and porous, and has poor or no catalytic activity with respect to the fuel and oxidant under the conditions of operation of the fuel cell 20, and preferably be poorly wetted by any liquid electrolyte solution(s) that may be present in the fluid mixture. As will be discussed below, the distributor properties are further selected so as to produce a higher hold up of an ionically insulating phase (e.g. gaseous oxidant) than an ionically conductive phase (e.g. aqueous fuel). The separator properties are selected so that the separator 18 is electronically insulating and porous on the micro- and/or nano-scale. In those embodiments where the separator 18 is not intrinsically an ionic conductor, the separator properties are selected so that the separator 18 is easily wettable by a suitable electrolyte solution(s) to become an ionic conductor under operating conditions. In those embodiments where the separator 18 is intrinsically an ionic conductor, the separator 18 can be an anion or cation membrane whose ionic conductivity is maintained by water from the reactant fluid mixture or generated by the fuel cell reactions. In some embodiments the anode and/or cathode can also contain solid ion exchange resins to support ionic conductivity through the electro-active volumes of the three-dimensional electrodes.

Material Selection

The materials selection for the fuel cell 20, and in particular the electrocatalysts, depends on the fuel, oxidant and electrolyte that are used. Examples of materials suitable for the anode 12 in the fuel cell 20 are substrates of metallic foam, metallic felt, metallic mesh, metalized carbon fibre mat, reticulate carbon, carbon felt, carbon cloth and carbon fibre paper, that may additionally incorporate electrocatalysts, including but not limited to Pd, Ru, Mo or Pt. Examples of materials suitable for the cathode 16 in the fuel cell 20 are substrates of metallic felt, metallic foam, metallic mesh, carbon felt, reticulate carbon, carbon cloth, metalized carbon fibre mat, and carbon fibre paper that may additionally incorporate electrocatalysts including but not limited to Pt, Ag, Pd, $MnO_2$, and organo-metal complexes of Co and/or Fe. The substrates alone may be electrocatalytic and/or electrocatalysts may be added to the substrates by methods known in the art, for example electrodeposition, electro-less deposition, or pasting/painting/spraying a catalyst or catalyst precursor slurry, containing optional additives such as carbon black, silica, surfactants and PTFE, onto the substrate with subsequent heat and/or pressure treatment as may be appropriate to cure and fix the catalyst to the substrate.

Examples of materials suitable for the distributor 14 are metal mesh, expanded metal sheet, metal foam, metal coated plastic or glass reticulate or mesh, reticulate carbon, etc. The distributor material may be optionally coated with hydrophobic or hydrophilic layers (though not necessarily at points of electronic contact) that promote separation of the flowing reactant fluid phases. The combination of component materials is preferably chosen to regulate the hold-up of a selected fluid phase in each component 12, 14, 16 of the fuel cell 20 as will be discussed below under the heading "Hold-Up and Partial Fluid Separation".

The separator 18 may be a micro/nano-porous material (such as a diaphragm) or a cation or anion membrane. Examples of materials suitable for the separator 18 in the fuel cell 20 are an anion or a cation exchange membrane (such as the proton exchange membrane used in conventional fuel cells), a microporous polyalkene, PVC, PTFE, PVA or polysuphone sheet, a cellulose acetate sheet, a porous ceramic film, and a glass cloth.

Mixed Reactant Stream

The mixed reactant flow-by fuel cell 20 operates using a single multi-phase mixed reactant stream instead of the conventional separate oxidant and fuel streams. The reactants in the mixed reactant fluid stream are each in separate fluid phases, i.e. the bulk fuel and the bulk oxidant are in separate phases. If present in the fluid mixture the electrolyte may be in a separate phase, or in the same phase as one of the bulk fuel or bulk oxidant. Alternatively, the fuel or oxidant may additionally act as electrolyte. A suitable multiphase reactant fluid can comprise a liquid and a gas phase, or two immiscible liquid phases or a gas phase with two immiscible liquid phases. Examples of such multiphase fluids include a fuel in the liquid phase (including formate salts, formic acid, methanol, borohydride salts, hydrazine, hydroxylamine salts, ethanol, ethylene glycol, methyl formate, dimethyl ether) and an oxidant in the gas phase (including oxygen, air, nitrous oxide, chlorine); a fuel in the gas phase (including hydrogen, ammonia, methanol vapour, ethanol vapour, formic acid vapour and dimethyl ether) and an oxidant in the liquid phase (including hydrogen peroxide, hydroperoxides, peroxides, peroxysalts, dioxiranes, nitric acid, nitromethane, ferric salts, ceric salts, permanganate salts, vanadium salts, etc.); a fuel in the liquid phase (for example, octane) and an oxidant in another liquid phase (for example, aqueous hydrogen peroxide), in which one of the liquids is an ionic insulator.

Assembly

The fuel cell components are physically configured such that the mixed reactant stream flows through the distributor 14 generally parallel to each anode 12 and cathode 16 in the fuel cell 20 in a flow-by mode wherein the mixed reactant fluid flow is generally orthogonal to the electric current, i.e. orthogonal to the stack direction. The fuel cell 20 is further configured such that the multiphase fluid mixture flows through each distributor 14 such that the reactant phases (that is, those fluid phases containing respectively the fuel and the oxidant) are at least partially separated as they flow by the anode and cathode. The properties of the distributor 14 are selected to provide the distributor 14 with a high effective electronic conductance to form an electronic pathway through the stack direction and a low effective ionic conductance to prevent shorting between the anode 14 and cathode 16 that are in adjacent contact with the distributor 14. Some shorting can occur in the distributor 14 when ionically conductive liquid in the mixed reactant fluid extends continuously from the anode 12 to the cathode 14 thereby providing an ionically conductive pathway across the distributor 14; such ionic shorting can be reduced by selecting the properties of the distributor 14 so that during fuel cell operation, there is a higher hold-up of the ionically insulating phase than ionically conductive liquid in the distributor 14 thereby reducing the likelihood of a continuous ionically conductive liquid pathway to form between the anode 12 and cathode 14.

A plurality of cell units 10 as shown in FIG. 1(a) may be combined into the fuel cell stack 22 in a bipolar configuration as shown in FIG. 2 between a pair of current collectors 24. Alternatively, multiple unit cells 20 as shown in FIG. 1(b) may be combined in monopolar configuration with intermediate current collectors 26. The multiphase reactant fluid flow may be in series or in parallel through the cell units 10. The fuel cell stack 22 shown in FIG. 2 is operating in series flow, as shown by arrows 28.

For example, in a representative mixed reactant fuel cell with a liquid phase fuel (such as aqueous sodium formate) and a gas phase oxidant (such as oxygen), the fuel cell 20 is configured, by selection of the materials properties of the electrodes 12, 16, such that flow of the aqueous liquid phase in and along the anode 12 is favoured, but that flow of the gas phase in the anode 12 is limited, while flow of the gas phase in and along the cathode 16 is favoured while flow of liquid phase in the cathode 16 is limited. That is, both electrodes 12, 16 operate essentially in the so-called "flow-by" mode, while the anode 12 and cathode 16 are designed to largely exclude respectively the oxidant and fuel phases. Net flow of fuel and/or oxidant through the electrodes in the direction parallel to the current is not required for operation of the fuel cell 20 in the monopolar or the bipolar mode, and is not desired for optimal performance. The desired flow behaviour is promoted by selecting the bulk fluid flow rates together with the properties of the fluid and the fuel cell components, as elaborated below.

Hold-Up and Partial Phase Separation

As noted above, the fuel cell 20 operates by employing mechanisms which cause a higher hold-up of one reactant phase over the other reactant phase in the anode 12 and/or the cathode 16, and in the distributor 14 (collectively "distributor matrix components"), and with selecting catalysts and mass transfer regimes to obtain the required reaction selectivity at the respective electrodes 12, 16. This desired hold-up for each porous component 12, 14, 16 is achieved by selecting certain physical properties of one or more of the anode 12, cathode 16 and distributor 14 and selecting certain fluid properties and dynamics of the mixed reactant fluid.

In general, the distribution and flow pattern of two (or more) fluid phases in porous solids depends on both fluid dynamic and interfacial factors that relate to the solid properties, the fluid properties and the fluid loads. Relevant solid properties are the porosity, pore, fibre or particle size distribution, tortuosity and connecteness (that together determine the permeability) along with the specific surface, roughness, material surface condition and electronic conductivity. Relevant fluid properties are the density, viscosity, ionic conductivity, surface tension (G/L), interfacial tension (L/L) and contact angle with the material of the porous solid. These solid and fluid properties interact to determine the capillary pressures and rate(s) of wetting of the porous solids by the fluids, and the flux of fluids through the porous solids in the direction of bulk flow. The fluid loads, along with the solid properties and the fluid properties determine the pressure gradient along the bulk flow path, and the hold-up and flux of each fluid phase in each porous solid.

In respect of the fuel cell 20, the mixed reactant fluid loads, mixed reactant fluid properties and the physical properties of the distributor matrix components 12, 14, 16 contribute to the degree of hold-up and flux of each fluid phase in each of the distributor matrix components 12, 14, 16 and the flux of fluids through the separator 18. Holding up the fuel phase in the anode 12 and the oxidant phase in the cathode 16 suppresses the undesired transport of reactants to their counter-electrodes, thus allowing a single unit cell 20 to operate with mixed reactants, in principle with or without electrocatalysts that have intrinsic kinetic selectivity. However, the use of selective (or partially selective) electrocatalysts for the anode 12 and/or the cathode 16 can be used improve the fuel cell performance and are present in the fuel cell 20 and stack 22 of the embodiments described herein.

In the embodiments describe herein, the physical properties of a particular distributor matrix component 12, 14, 16 are selected to modify the hold-up (distribution) of fuel and oxidant phases in that component 12, 14, 16 and to promote partial separation of fuel and oxidant onto/into the respective anode 12 and cathode 16. One particular property that can be selected to achieve the desired hold-up in a distributor matrix component 12, 14, 16 is the capillary pressure of the distributor matrix component 12, 14, 16 in respect of the reactant fluid which is desired to be held up in that component 12, 14, 16. Exemplary physical properties that affect the capillary pressure of each phase and the pressure gradient in the flowing fuel/oxidant mixture include surface wetting angle by fuel and by oxidant phases, porosity, pore size, permeability, surface roughness, specific surface area, and form (e.g. particles, fibres, reticulate.).

To select the appropriate capillary pressure that provides the desired hold-up, consider that the capillary pressure of a fluid A relative to a second immiscible fluid B in a porous solid is the pressure that must be exerted by fluid B to drive fluid A out of the pores (if fluid A is a liquid, fluid B can be a liquid or a gas; if fluid A is a gas, then fluid B must be a liquid). For cylindrical pores of uniform radius the capillary pressure is given by:

$$p = 2\gamma_{A/B} \cos\theta_{A/B}/r \quad \text{(equation 1)}$$

Where:
p=capillary pressure
$\gamma_{A/B}$=interfacial tension between fluids A and B
$\cos\theta_{A/B}$=cosine of the "contact angle" (i.e. wetting angle) of fluid A versus fluid B on the solid surface
r=pore radius The contact angle is the angle at which the fluid A meets fluid B at the solid surface. The contact angle is determined by the resultant of adhesive forces between the fluids and the solid, and cohesive forces within the fluids. For example, the tendency of a drop of a liquid to spread out over a flat solid surface increases as its contact angle decreases; thus, the contact angle provides an inverse measure of wettability.

As can be seen in Equation (1), the capillary pressure of a first fluid relative to a second fluid in the distributor matrix component 12, 14, 16 is a function of the interfacial tension of the two fluids, the pore size in the component 12,14,16, and the physical properties of the two fluids and the component 12, 14, 16 which contribute to the adhesive and cohesive forces. Therefore, selecting the appropriate capillary pressure for the desired hold-up in each distributor matrix component 12, 14, 16 will require selecting the physical properties of the component 12, 14, 16 in view of the particular fluid phases in the mixed reactant stream.

Relevant component properties for determining the capillary pressure, plus other effects that are relevant to fuel cell operation such as the wetting rates, fluid fluxes and voltage drop in components include: the porosity, pore, fibre, particle size distribution, tortuosity, and connectedness along with the specific surface, roughness, thickness (i.e. dimension orthogonal to direction of the bulk fluid flow), material surface condition and electronic conductivity. In some embodiments involving aqueous liquids, the solid properties will include the hydrophilic and hydrophobic nature of the solid surfaces, whereas in other embodiments, involving non-aqueous liquids, the solid properties will include the oleophilic and oleophobic nature of the solid surfaces.

Selecting the load of each fluid phase in the mixed reactant stream for the fuel cell 20 will also affect the performance of the fuel cell 20. Fluid load in this context refers to the ratio of mass flow rate to the cross-sectional area of the cell unit 10 taken orthogonal to the bulk mixed reactant fluid flow. Fluid loads affect the distribution of each fluid in the bulk flow stream, which is of particular relevance to the issue of ionic shorting in the distributor 14. For the simple case of gas/liquid flow in a pipe, depending on the pipe orientation, fluid loads and surface tension, the gas/liquid flow regime can range from "bubble" to "plug" to "stratified" to "slug" to "annular" and finally "dispersed". Analogous flow regimes occur with two-phase flow though porous solids. For gas/liquid systems an increase in the gas/liquid flow ratio drives the flow regime from "bubble" (liquid continuous) through to "dispersed" (gas continuous). This progression of flow regimes generally corresponds to a decrease in the liquid hold-up, as well as a loss of integrity (connectivity) of the liquid phase orthogonal to the direction of bulk fluid flow. Analogous effects occur with two immiscible liquid phases. Those effects of decreasing the hold-up and connectivity of a liquid phase allow bipolar operation of a stack of cells in which the subject liquid is an ionic conductor. The reason here is that any coherent ionic path between the anode and cathode of a cell unit 10 allows for an ionic current "by-pass" between those electrodes that tends to short the bipole. The fluid loads of each phase also interact with the properties of the distributor matrix components 12, 14, 16 to affect the hold-up and flux of each fluid in each electrode.

In some embodiments the volumetric phase flow ratio has a large effect on the performance of the fuel cell 20 and it is desirable to keep this ratio in an appropriate range. For example, in some cases, when a gas phase oxidant (eg. G=air) is used with an ionically conductive liquid phase fuel (L) the performance of the fuel cell improves as the volumetric G/L flow ratio increases from about 1 to about 1000. Apart from the above physical factors the reaction selectivity may be affected by controlling chemical factors such as the concentration of fuel and/or oxidant, the anode and cathode catalyst selection, loading and particle size, the temperature, etc. Such physical and chemical factors, together with the separator properties and the dimensions (length, width, thickness) of each unit cell determine the performance of the bipolar fuel cell stack.

Figure 3A:
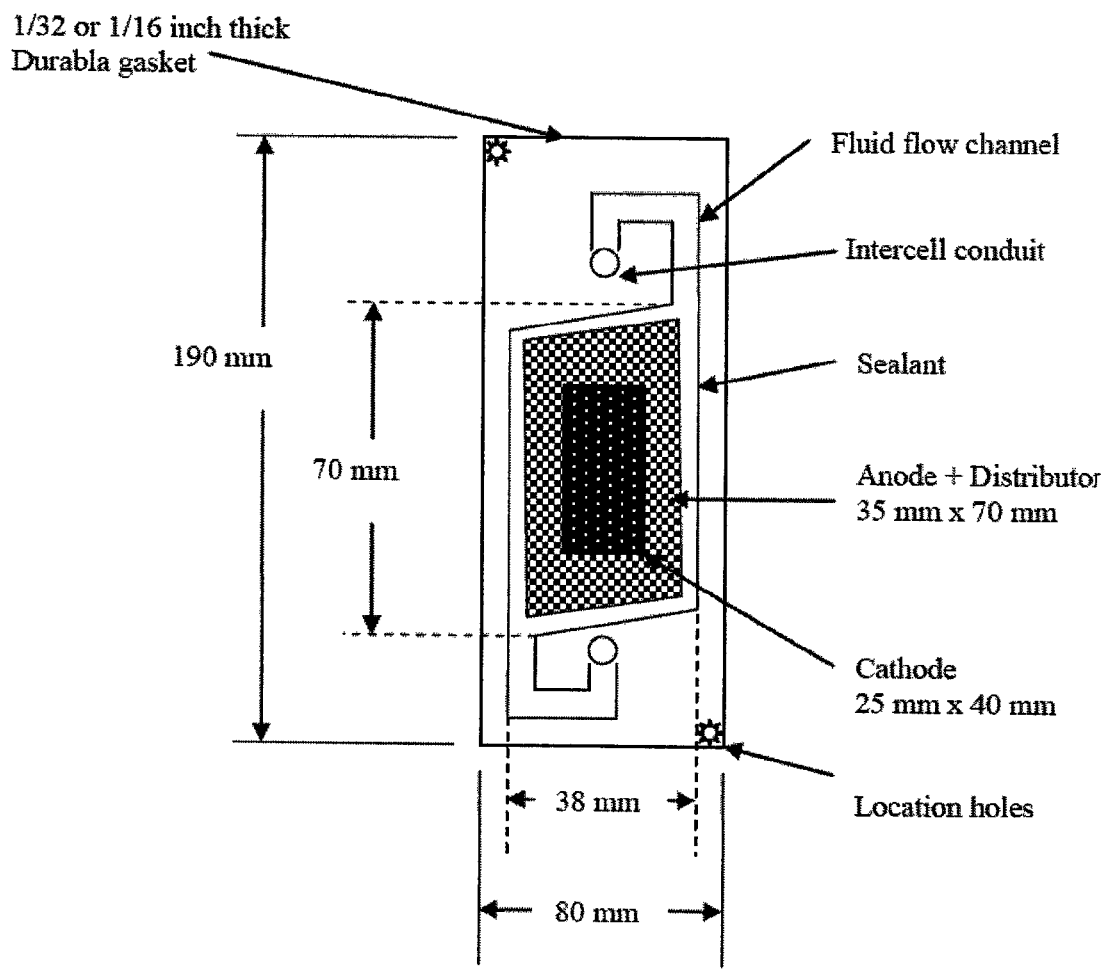
FIGS. 3(a) and (b) are schematic representations of two experimental fuel cells according to the fuel cell shown in FIGS. 1(a) and (b) wherein the fuel cell shown in FIG. 3(a) was used in first to fifth experiments, and the fuel cell shown in FIG. 3(b) was used in sixth to tenth experiments.
Figure 3B:
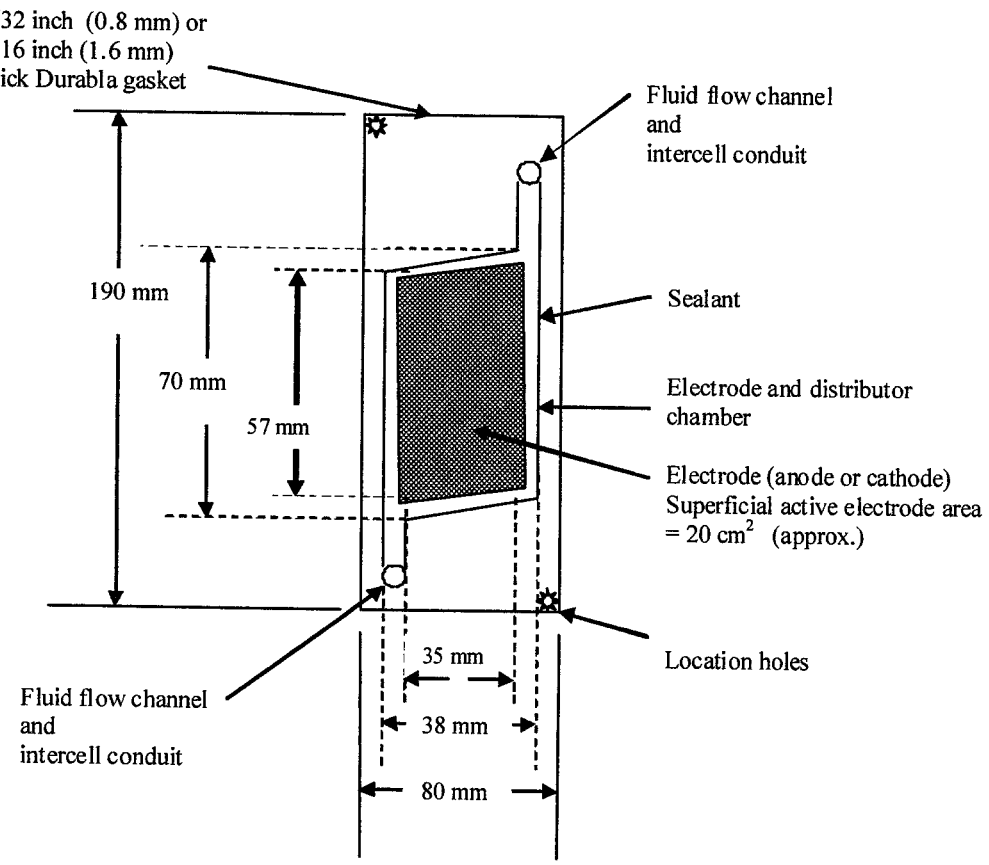

In a representative example, an aqueous liquid phase fuel (such as an aqueous solution of sodium formate) and a gas phase oxidant (such as oxygen or air) could be used in the mixed reactant stream, along with an aqueous phase electrolyte (such as sodium hydroxide) in an embodiment of the fuel cell 20 wherein the separator 18 is not intrinsically ionically conductive. In such an example, the anode 12 is porous and hydrophilic with a hydrophilicity that provides a sufficiently high capillary pressure and rate of wetting, causing a higher hold-up for the fuel solution than the oxidant gas, and have a high catalytic specific surface area; the distributor 14 is hydrophobic with a sufficiently large pore (or mesh) size to suppress liquid coalescence and thus prevent the formation of ionically conductive pathways across the thickness of the distributor 14; the cathode 16 is hydrophobic with a hydrophobicity that provides a sufficiently low (or negative) capillary pressure to reject the fuel solution thus resulting in a higher hold-up of oxidant gas, and have a high catalytic specific surface area; and the separator 18 is hydrophilic with a sufficiently high capillary pressure to retain the liquid electrolyte, and suppress or ideally eliminate the flow of gas through the separator to adjacent cell units. The separator 18 also has a relatively low liquid permeability to suppress the flow of liquid through the separator to adjacent cells (e.g. the aqueous fuel), while maintaining sufficient effective ionic conductivity for fuel cell operation. In general, the bulk gas and liquid in the reactant stream should travel in the flow-by mode through each cell unit 20, as shown in FIG. 1(*a*). The flow of gas and/or liquid through the separator 18 would be undesirable, at least in so far as it represents fluid by-pass of part of the anode and/or cathode. The transfer of liquid and gas between adjacent cell units in series flow embodiments can be managed by dedicated inter-cell conduits and flow channels as shown in FIGS. 2 and 3.

Operation

In operation, the multiphase mixed reactant fluid is fed into the fuel cell 20, and in particular into the distributor 14 of the fuel cell 20. During passage of the mixed reactant fluid through the fuel cell 20, the interaction of the mixed reactant fluid with the distributor 14, anode 12 and cathode 16 cause an at least partial separation of phases of the mixed reactant fluid. The selectivity of the electrocatalyst materials, along with the mass transfer regimes, provides a selective reactivity at the electrodes 12, 16 for the appropriate reactant (that is, fuel at anode 12 and oxidant at cathode 16). The partial separation of the phases is promoted by the wetting angles, porosities and permeabilities of the electrodes, along with the fluid properties and fluid dynamics of the multiphase flow.

The mixed reactants, that is the fuel phase and the oxidant phase, are mixed before, on, or shortly after entering the fuel cell 20 and remain predominantly in these phases throughout the fuel cell. The fuel cell 20 is designed to operate in a continuous manner in which fuel and oxidant streams are fed continuously to the fuel cell 20. The fuel cell 20 is operated in a flow-by configuration such that fuel and oxidant bulk flow is predominantly orthogonal to the electric current.

Alternate Embodiments

While the fuel cell stack 22 shown in the Figures show a planar array of components, it should be noted that the fuel cell configuration is not limited to a conventional stack of parallel flat cells, but may be unconventional cylindrical, spiral wound, "Swiss roll" or other forms that take advantage of the mixed reactant flow and may also accommodate the gradients in composition, current density, pressure and temperature that occur in a practical reactor. In an alternative embodiment, the fuel cell 20 can consist of a series of interconnected concentric cylindrical or spiral wound cells on a central mandrel (not shown) that may also function as a current collector and/or fluid conduit. In this tubular configuration the multiphase reactant fluid flow progresses from the central cell (inlet) to the outer cell (outlet). Here the increase in the flow area and the electrode area from inlet to outlet allows respectively for expansion of any gas phase (due to pressure drop and temperature rise) and decrease in superficial current density (due to conversion of the reactants).

Alternate embodiments include the use of non-aqueous liquid phases to carry the fuel or oxidant. In such cases the oleophilic and/or oleophobic nature of surfaces of the fuel cell components would be an important consideration in the fuel cell design.

Example

A large number of different materials is compatible with the fuel cell stack 22 and can be used for the different components of the fuel cell 22 in various combinations. The fuel cell stack 22 thus demonstrates broad applicability, and can be practiced with low-cost as well as readily-available materials. Furthermore, a wide range of operating conditions is possible with the fuel cell stack 22 and a large matrix of variable conditions is available, making the fuel cell stack 22 useful across a range of operating requirements. By way of representative examples, and without intending to limit the scope of the invention, some examples of operating conditions, used in various combinations include: electrode superficial areas up to 20 cm$^2$; use of air or oxygen as fuel; volumetric gas/liquid flow ratios from 10 to 1000; different fuels such as formate, borohydride and methanol; temperature ranges from about 298 K to about 350 K; and pressures from about 100 kPa(abs) to about 240 kPa(abs).

Figure 5:
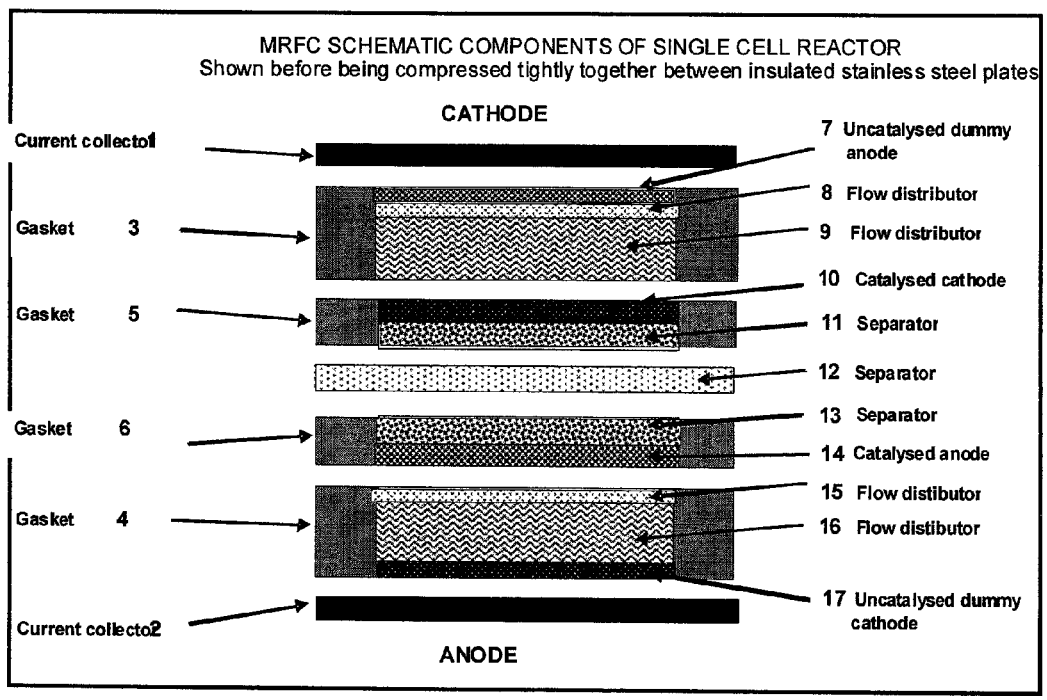
FIG. 5 is a schematic exploded view representation of an experimental fuel cell according to the fuel cell shown in FIG. 1(b) and used in the sixth to tenth experiments.
Figure 7:
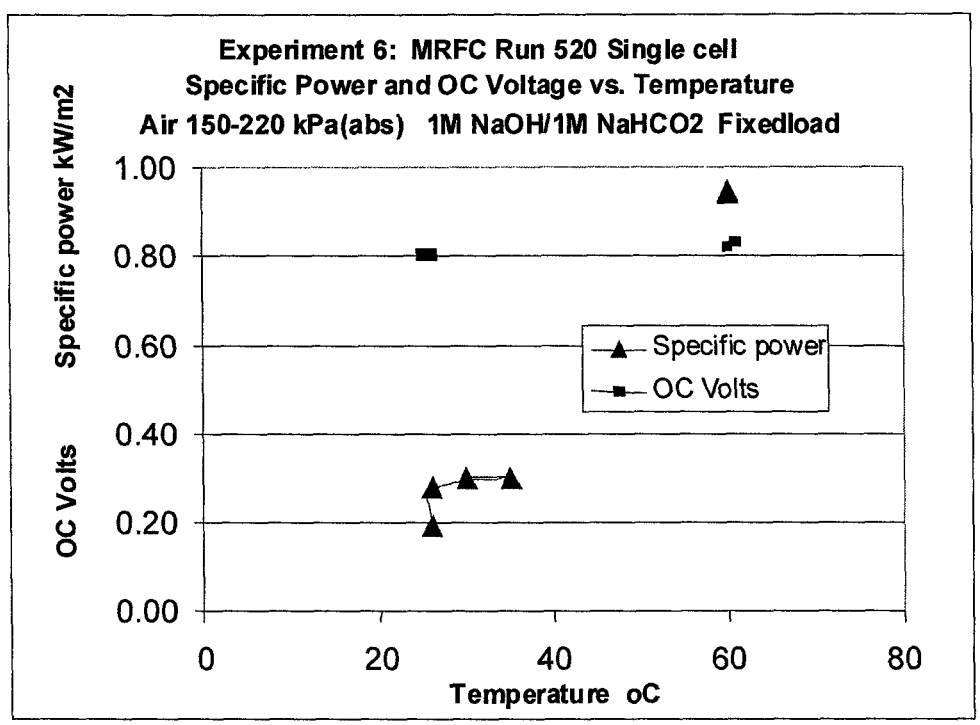
Figure 9:
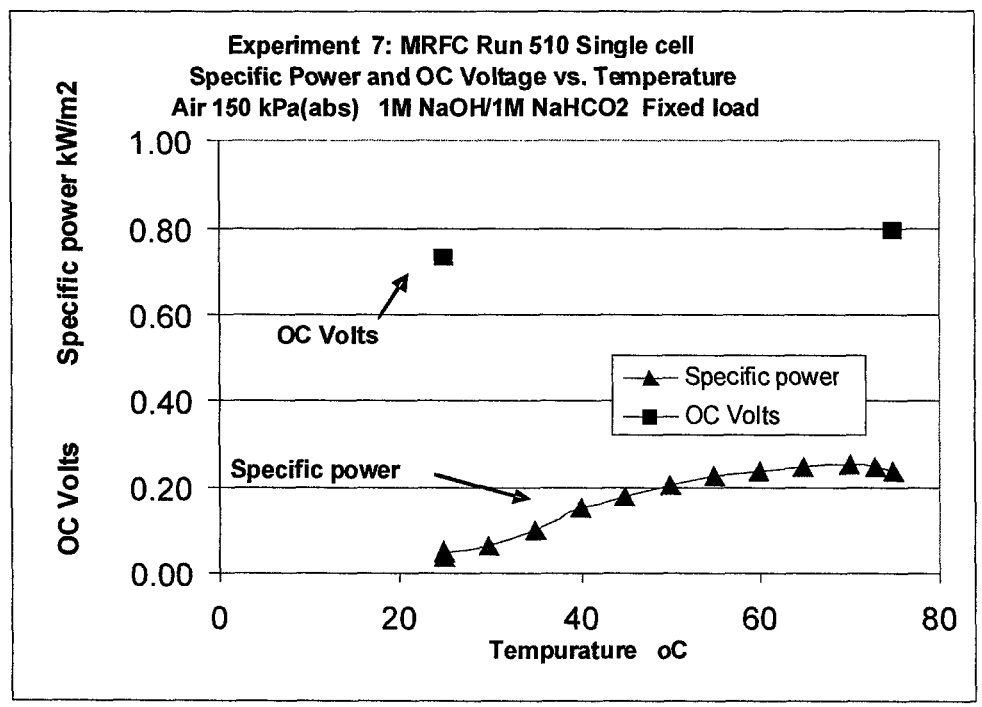
Figure 11:
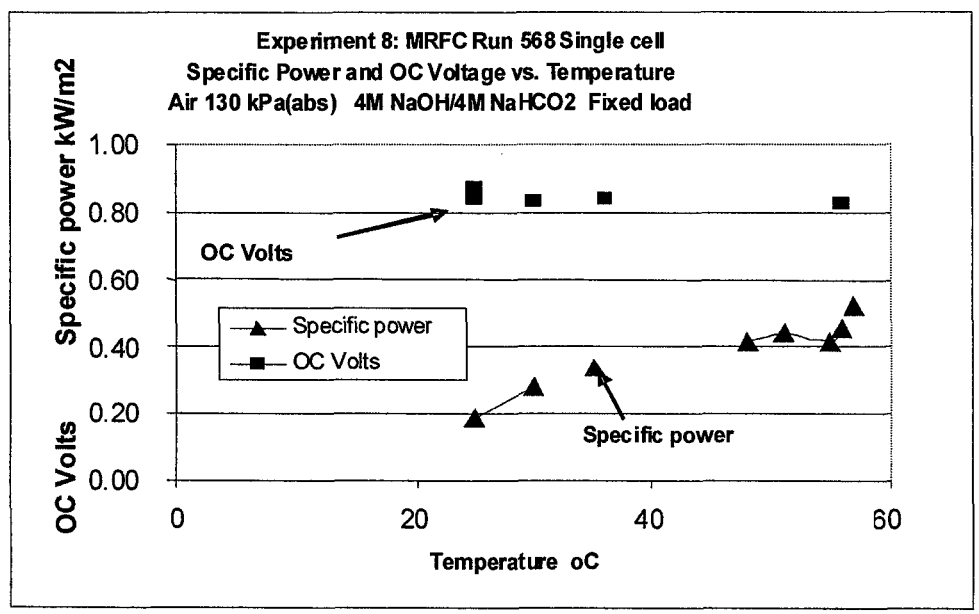
Figure 13:
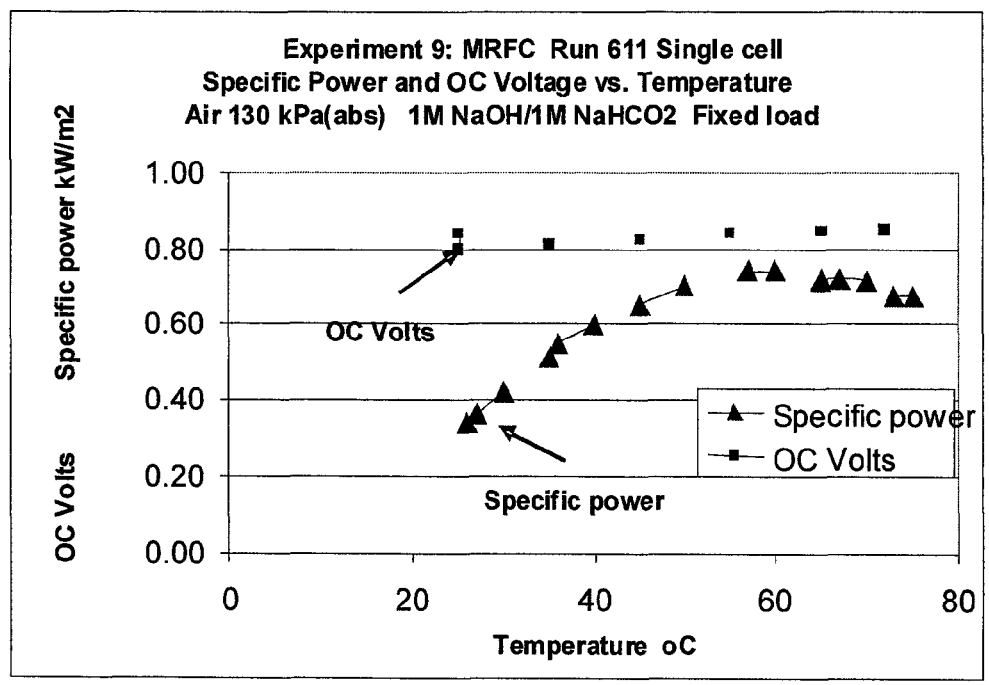
Figure 15:
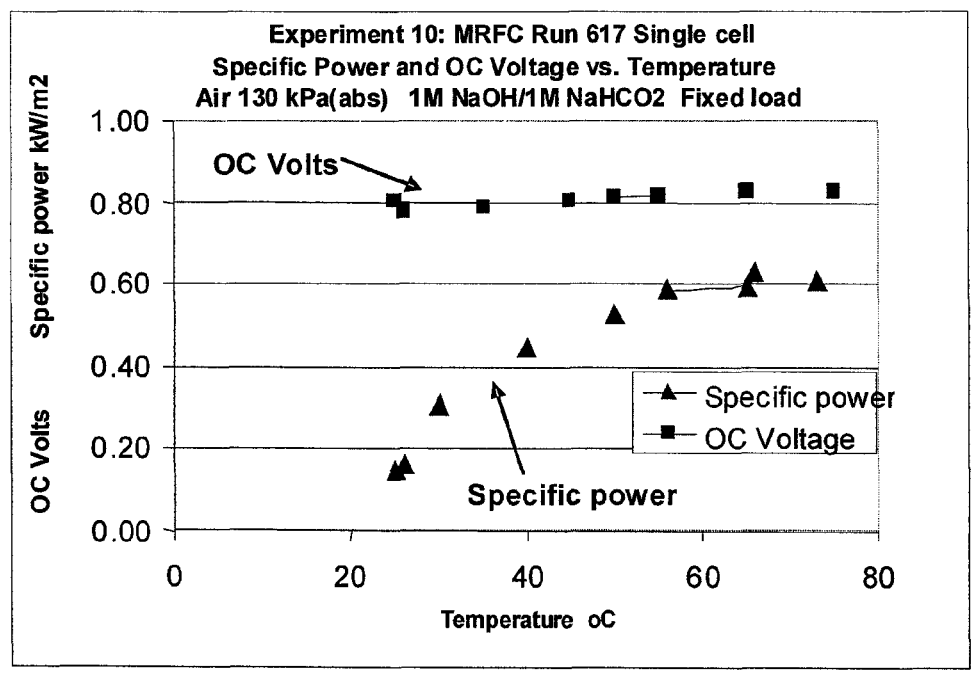

Consider as a conceptual example, a fuel cell stack set up as in FIG. 2 as a bipolar stack with three unit cells 20. As shown in FIG. 2, the fuel cells 20 in this stack 22 are connected in series with respect to both the electric circuit and the fluid flow. The configuration of each cell 20 is as shown in FIGS. 3 and 5 and the system specifications are as follows:

Active superficial area per cell=35 mm wide by 57 mm long=20 cm$^2$
Anode=palladium loaded nickel carbon mat. Approx Pd content=0.05 kg/m$^2$
  Approximate Thickness=0.4 mm. Fibre diameter=10 micron.
  Porosity=90% and pore diameter=100 microns.
Distributor=Gold plated expanded steel mesh
  Approximate Thickness=1.5 mm, Mesh opening=4 mm by 3 mm.
  Porosity=80%
Cathode=Teflonated carbon GDL loaded with a mixture of Teflon, silver and manganese dioxide.
  Approximate Thickness=0.35 mm, Porosity=60%, Pore diameter=10 microns
Separator=One sheet of hydrophilic Solupor E9H01A between two sheets of hydrophilic Scimat 720/20
  Approximate Thickness=0.2 mm., porosity=80%, pore diameter=0.1 micron
Total thickness per cell=2.5 mm. (approx).
Fuel=formate anion
  Fuel phase=aqueous (liquid) solution of 1M sodium formate+1 M sodium hydroxide
  Flow=10 ml/minute
Oxidant=oxygen
  Oxidant phase=gaseous air. Flow=2000 standard ml/minute
  Pressure in/out=200/100 kPa(abs)
  Temperature in/out=25/25° C. (assumed isothermal for this example)

In operation (see FIG. 4) the fuel phase and oxidant phase are delivered separately to a mixing tee then through a double-pipe heat exchanger and to the fuel cell inlet port via a ¼ inch OD tube in 2-phase (G/L) flow. The bulk 2-phase mixture then flows through the cells in series. Conceptually, in each cell unit 10 the bulk 2-phase mixture flows through the coarse mesh distributor 14, parallel to the electrodes 12, 16. The liquid fuel phase readily and rapidly wets the anode 12 so part of the liquid is absorbed by the anode 12, where it provides formate to support the anode reaction. The fast wetting and high capillary pressure of the fuel phase in the anode 12 prevents access of the gaseous oxidant phase to the anode 12.

Applying equation (1) to the anode 12 in this example:

$$p=2\gamma_{A/B} \cos \theta_{A/B}/r \quad \text{(equation 1)}$$

wherein,
  A=liquid solution [sodium formate+sodium hydroxide] in water at 25° C.
  B=air (gas) at 25° C.
  $\gamma_{A/B}$=80E-3 N/m
  $\theta_{A/B}$=20 degrees for A on a rough metal catalyst surface.
  r=0.5E-4 m $$p=2(80E3 \text{ N/m})(\cos(20))/(0.5E\text{-}4 \text{ m})= 3E3 \text{ N/m2}=+3.0 \text{ kPa}$$

This result shows that a pressure differential of 3 kPa is required to drive liquid out of the pores. In other words, the liquid "moves" into the pores and wets out the anode 12.

Also, at one atmosphere absolute pressure and 25° C. the solubility of oxygen (from air) in the fuel phase is only about 1 mM, whereas the bulk fuel concentration is 1 M, so diffusion of oxygen into the anode 12 cannot match the rate of formate reaction at practical superficial current densities (e.g. about 0.5 to 5 kA/m$^2$). The coupled effects of capillary action and reactant concentration constrain the penetration of oxygen in the anode 12 and suppress unwanted mixed-potentials that lower the fuel cell performance.

Meanwhile the hydrophobicity of the face of the cathode 16 in contact with the distributor 14 repels the fuel phase and allows penetration by the oxidant phase, to support the cathode reaction at the triple-phase oxidant/electrolyte/catalyst interfaces in the body of the cathode 16

Applying equation (1) to the cathode 16 in this example:

$$p=2\gamma_{A/B} \cos \theta_{A/B}/r \quad \text{(equation 1)}$$

A=liquid solution [sodium formate+sodium hydroxide] in water at 25° C.
  B=air (gas) at 25° C.
  $\gamma_{A/B}$=80E-3 N/m
  $\theta_{A/B}$=110 degrees for A on Teflonated graphite surface at 25° C.
  r=0.5E-5 m $$p=2(80E\text{-}3 \text{ N/m})(\cos(110))/ (0.5E\text{-}5 \text{ m})=-11E3 \text{ N/m2}=-11 \text{ kPa}$$

This result demonstrates that a differential pressure of 11 kPa is required to drive liquid into the pores. In other words, the liquid will tend to move out of the pores and the gas will tend to move into the pores.

Here the electrolyte is the fuel solution that reaches the active cathode face by diffusion and/or convection through the microporous separator 18.

Due to the presence of the fuel (formate) in the electrolyte, and depending on the relative rates of access of oxygen and formate to the cathode 16, it is desirable to use a cathode catalyst with intrinsic kinetic selectivity for the reduction of oxygen over the oxidation of formate. Silver and manganese dioxide fill this role in alkaline electrolytes.

The volumetric flow ratio of oxidant phase to fuel phase in the feed mixture (corrected for pressure) is: G/L=1000/10=100. (Based on the superficial flow area of the distributor (35 mm by 1.5 mm) the corresponding fluid loads are approximately: Oxidant phase=0.8 kg/m$^2$.s Fuel phase=3.0 kg/m$^2$.s.)

The high volumetric ratio of gas to liquid flow in the distributor 14 breaks up the liquid phase and establishes a two-phase flow regime that presents poor ionically conductive paths across the distributor 14 and allows the stack 22 to function in the bipolar mode. Ideally the distributor 14 would function in a "gas continuous" regime that presents no coherent ionic path across the cell unit 10.

Since the pressure drop through (i.e. in the direction of bulk fluid flow) each cell unit 10 is about 20 kPa, the microporous separator 18 may allow a flux of fluid that would by-pass the cell unit 10. This undesirable fluid by-pass is suppressed by the use of a hydrophilic separator 18 with submicron pores that present a high capillary pressure when wetted by the aqueous fuel phase. In this case a capillary pressure above 20 kPa prevents the gas from penetrating the separator 18. The separator 18 has relatively low liquid permeability that suppresses liquid by-pass, but the permeability should not be too low because decreasing the permeability usually lowers the ionic conductivity of the separator 18. The problem of fluid by-pass through the separator 18 could be avoided by use of an ion-selective membrane separator, in this case preferably an anion-selective membrane. However the ionic conductivity of an ion-selective membrane would be about an order of magnitude lower than that of the microporous separator saturated with 1 M sodium hydroxide solution.

The theoretical (thermodynamic) open circuit (OC) potential of a single cell is 1.4 Volt and that of a 3 cell bipolar stack is (3)(1.4)=4.2 Volt.

The effects of mixed-potentials and electrocatalyst deficiencies bring the measured open circuit potential of a single cell to 0.8 Volt, and allows a single cell to deliver a current of 3 Amp at 0.2 Volt.

The expected OC potential of a 3 cell bipolar stack is then (3)(0.8)=2.4 V

In operation the 3 cell stack shows an OC potential of 1.5 Volt and delivers a current of 3 Amp at 0.4 Volt.

Stoichiometry.

The feed rates of fuel and oxidant to the stack 22 are:
Fuel=(10 ml/min)(1 mol/L)/(1000 ml/L)=10E-3 mol/min
Oxidant=(2 L/min)(0.21 mol fraction O2)/(22.4 L/mol)=19E-3 mol/min By Faraday's law the amounts of fuel and oxidant consumed by electrochemical reactions in the three cell stack at 3 Amp are:
Fuel=(3 A)(60 s/min)(3 cells)/[(2)96480)]=2.8E-3 mol/min
Oxidant=(3 A)(60 s/min)(3 cells)/[(4)(96480)]=1.4E-3 mol/min Fuel conversion=2.8E-3/10E-3=28%
Oxidant conversion=1.4E-3/19E-3=7%

The fuel and oxidant conversion are variables that would be considered in optimizing the fuel cell design.

Due to slow reaction kinetics the conversion of formate (fuel) and oxidant (oxygen) by thermochemical reaction is relatively low in this system.

Experiments

The following exemplary experiments are provided to aid in the illustration and description of the embodiments of the invention, without meaning to limit the invention to the materials or methods described in these experiments. It should be understood that these examples are illustrative and should not be considered limiting with respect to the spirit or scope of the invention. Furthermore, alternative embodiments and means of practicing the invention will become clear to one skilled in the art by these representative experiments.

In each experiment described below the dimensions of the unit cell are fixed by containing the anode, the fluid distributor and sometime the cathode in a volume cut from Neoprene-asbestos (Durabla) gaskets with the dimensions shown in FIG. 3. The unit cell(s) are compressed with the anode and cathode current collector plates between two ¾ inch thick Plexiglass or insulated stainless steel blocks using 6, ¼ inch stainless steel bolts. These compression blocks include tube fittings for passing the fuel/oxidant mixture through the cell stack, via the intercell conduit holes and flow channels cut in the gaskets.

Figure 4:
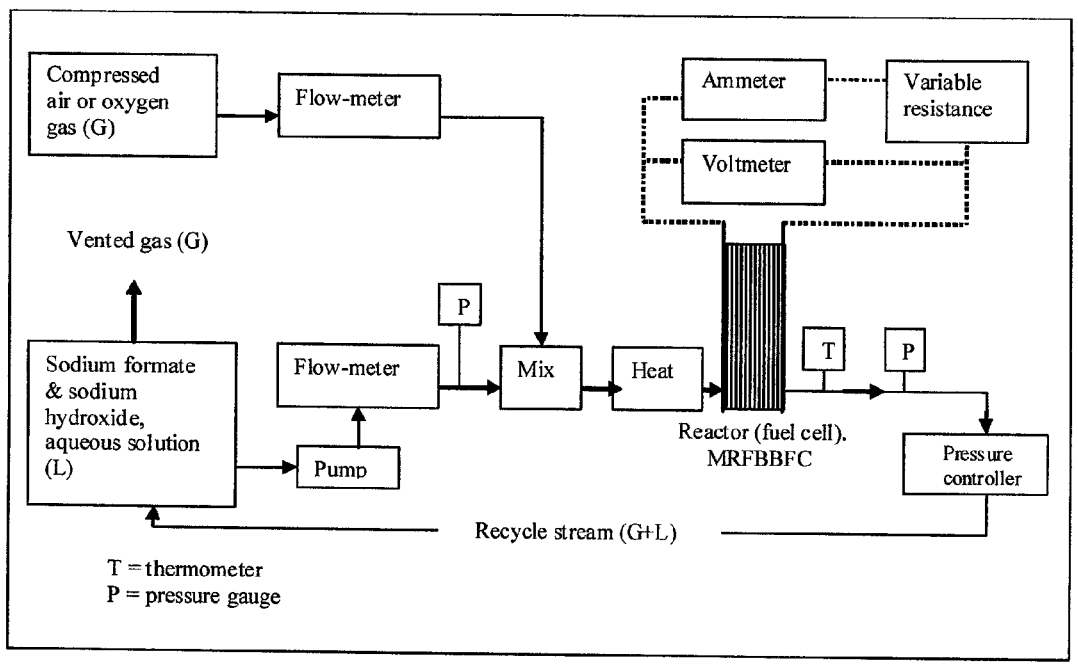
FIG. 4 is a schematic representation of an apparatus used for testing the fuel cells shown in FIGS. 3(a) and (b).

The experimental set up is shown in FIG. 4 for the case of a mixed reactant flow-by bipolar fuel cell (MRFBBFC) such as that shown in FIG. 2. In this fuel cell reactor the fluids (gas+liquid) flow via the "flow-by" mode, in series through the cells of the bipolar stack. The single cell tests used the same set up, except the MRFBBFC stack was replaced by a single monopolar fuel cell (i.e. a MRFBFC) configured as in FIG. 1(*b*). As illustrated in FIG. 4 and in most of the examples provided here, sodium formate was used as fuel, oxygen or air was used as oxidant, and sodium hydroxide was used as the added electrolyte. The sodium formate and sodium hydroxide were dissolved in water to make the liquid phase containing both fuel and electrolyte. In this case the fuel is also an electrolyte, while the sodium hydroxide serves both to increase the ionic conductivity and to raise the pH of the fuel solution.

In the experiments provided here, the desired reactions in the MRFBFC under alkaline conditions, with formate as the fuel and oxygen as the oxidant are:

$E_o$ V SHE @ 298 K (a) Anode: $CO_2 + H_2O + 2e^- \leftarrow HCO_2^- + OH^-$ −1.02

(b) Cathode: $½O_2 + H_2O + 2e^- \rightarrow 2OH^-$ +0.40

(c) Full cell: $½O_2 + HCO_2^- \rightarrow CO_2 + OH^- \rightarrow HCO_3^-$ +1.40

In the mixed reactant fuel cell a good possibility exists for three undesired reactions, i.e.:

Electroreduction of the oxidant ($O_2$ here) on the anode (d) Anode: $½O_2 + H_2O + 2e^- \rightarrow 2OH^-$ +0.40

Electrooxidation of fuel ($HCO_2^-$ here) on the cathode (e) Cathode: $CO_2 + H_2O + 2e^- \leftarrow HCO_2^- + OH^-$ −1.02

Thermochemical reaction between fuel and oxidant at any point in the system where they are in contact with each other, i.e.:

(f) Thermochemical reaction: $½O_2 + HCO_2^- \rightarrow CO_2 + OH^- \rightarrow HCO_3^-$ Reactions (d) and/or (e) would set up mixed potentials on the respective electrodes that lower the open circuit voltage and the power output of the fuel cell under load. Reaction (f) would consume reactants without generating electricity, thus wasting fuel and oxidant and lowering the energy efficiency and power available from the fuel cell.

An objective of the mixed reactant fuel cell design is to provide conditions that promote the desired fuel cell reactions (a),(b), and (c) and suppress the undesired reactions (d),(e), and (f). In particular, the design seeks to select capillary effects that provide conditions which suppress reactions (d) and (e), i.e. suppressing access (mass transfer) of oxidant to the anode and of fuel to the cathode. The consequence of this would be to maintain fuel in the anode and oxidant in the cathode—thus "promoting" the desired reactions (a), (b) and (c).

A number of different materials have been successfully used for different components of the fuel cell of the invention in various combinations. Table 1(a) provides some representative examples of materials that can be used, depending on the fuel, oxidant and/or electrolyte chosen. This list demonstrates the ability of the fuel cell to be made with low-cost and readily-available materials.

TABLE 1(a)

Examples of fuel cell components in Experiments 1 to 5

| Component | Description | ID | Source |
|---|---|---|---|
| ANODE | Pd on Ni felt | A1 | Immerse 1 mm thick Ni felt[a] in an aqueous solution of [$PdCl_2$ (5 g/L) + HCl (18 g/L)], 5 min 20° C. |
| | Pd on Ni foam | A2 | Immerse 1.7 mm thick Ni foam[b] in an aqueous solution of [$PdCl_2$ (5 g/L) + HCl (18 g/L)], 5 min 20° C. |
| | Pd on C/Ni felt | A3 | Immerse 2 mm thick Ni coated[e] C felt[c] in an aqueous solution of [$PdCl_2$ (1 g/L) + HCl (2 g/L)], 5 min 20° C. |
| | Pd on C/Ni cloth | A4 | Immerse 1 mm thick Ni coated[f] C cloth[d] in an aqueous solution of [$PdCl_2$ (1 g/L) + HCl (2 g/L)], 5 min 20° C. |
| DISTRIBUTOR | SS mesh | D1 | 8[#] stainless steel, ca. 1 mm thick |
| | Ni mesh | D2 | 100[#] nickel, ca. 0.5 mm thick |
| | Steel expanded mesh | D3 | Strip plastic coating from metal mail tray (4 × 3 mm mesh openings) purchased at STAPLES Office Supplies Vancouver, Canada. Optionally with a hydrophobic coating of PTFE (Teflon), except at points of electronic contact with the electrodes. |
| | Gold plated D3 | D4 | Electroplate uncoated D3 with 1 micron gold. |
| CATHODE | Pt/C/PTFEGDE | C1 | ELAT NC. ETEK Inc. USA. (PEMEAS Fuel Cell Technologies) |
| | Pt/C/PTFEGDE | C2 | ELAT 250-EW. ETEK Inc. USA. (PEMEAS Fuel Cell Technologies) |
| | Ag on Ni felt | C3 | Immerse Ni felt[a] in aqueous 1M $AgNO_3$ 72 hours 20° C. |
| | Ag on Ni foam(i) | C4 | Immerse Ni foam[b] in aqueous 1M $AgNO_3$ 5 min 20° C. |
| | Ag on Ni foam(ii) | C5 | Immerse Ni foam[b] in aqueous slurry of [$AgNO_3$ + $NH_3$ + $NH_4HCO_3$ + Triton X-100 + PTFE 30 + C black], heat at 350° C. for 40 mins. Repeat 1 to 3 times. |
| | Ag on Ni mesh(i) | C6 | Immerse Ni 100[#] mesh in aqueous 1M $AgNO_3$ for 5 mins at 20° C. |
| | Ag on Ni mesh(ii) | C8 | Immerse Ni 100[#] mesh in aqueous slurry of [$AgNO_3$ + $NH_3$ + $NH_4HCO_3$ + Triton X-100 + PTFE 30 + C black], heat at 350° C. for 40 mins. Repeat 1 to 3 times. |
| | Ag on C felt | C9 | Immerse C felt[c] in aqueous slurry of [$AgNO_3$ + $NH_3$ + $NH_4HCO_3$ + Triton X-100 + PTFE 30 + C black], heat at 350° C. for 40 mins. Repeat 1 to 3 times. |
| | Ag on C cloth | C10 | Immerse C cloth[d] in aqueous slurry of [$AgNO_3$ + $NH_3$ + $NH_4HCO_3$ + Triton X-100 + PTFE 30 + C black], heat at 350° C. for 40 mins. Repeat 1 to 3 times. |
| | GDL | C11 | ELAT 2500 W ETEK Inc. USA. (PEMEAS Fuel Cell Technologies) |
| SEPARATOR | Anion membrane | S1 | Ionics Inc. USA |
| | Celgard 2400 | S2 | Microporous hydrophilic polypropylene. Celgard LLC, Charlotte, USA |
| | PHDC 120 | S3 | Microporous hydrophilic polypropylene. RAI, New Jersey, USA |
| | SCIMAT700/20 | S4 | Microporous hydrphilic polypropylene. SCIMAT Ltd. UK |
| | Porous PVC/$SiO_2$ | S5 | Lead/acid battery separator |
| | ZAMMO | S6 | Alkaline battery separator, RAI, New Jersey, USA |
| | Pellon | S7 | Wettable polymer sheet. |
| | J-cloth | S8 | London Drugs, Vancouver, Canada |
| | Magic cloth | S9 | London Drugs, Vancouver, Canada |
| | Filter felt | S10 | Home Depot, Vancouver, Canada |
| | Glass cloth | S11 | Home Depot, Vancouver, Canada |
| | Cation membrane | S12 | Nafion 117 Dupont Corp. USA |

Miscellaneous (footnotes).

[a]Ni felt 1 mm thick, 20 um fibre. National Standards Corp. New Jersey USA. Bekeart Fibre Technologies Zwevegem Belgium

[b]Ni foam 1.7 mm thick, 580 um/100 ppi, INCOFOAM Inco Ltd. Wyckoff USA

[c]C felt ca. 20 um fibre, 95% porosity. Metaullics Systems Inc. Sanborn, USA

[d]C cloth ca. 20 um fibre. Metaullics Systems Inc. Sanborn, USA

[E]Ni coated C felt Coat ca. 20 um C fibres with ca. 1 um Ni by electro-less deposition

[F]Ni coated C cloth Coat ca. 20 um C fibres with ca. 1 um Ni by electro-less deposition GDE = gas diffusion electrode. GDL = gas diffusion layer.

In addition to the wide range of materials compatible with the MRFBFC, the fuel cell has been demonstrated to work over a wide range of operating parameters depending on the reactor configuration, the fuel used and the materials selected.

Experiment 1: A Single-Cell MRFBFC

The following example demonstrates operation of a representative MRFBFC unit cell using sodium formate liquid phase fuel (aqueous mixture of 1 M NaOH, 4M formate) and configured as in FIG. 1(b). The unit cell was 1.6 mm thick, the anode and cathode areas were 20 and 10 cm², respectively. A single cell was operated using the anode A3 from Table 1, distributor D4, a cathode comprised of C2+C11, and a separator of S4+S9. Representative results are shown below. A maximum current density of 3.5 kA/m² based on the limiting cathode area, with corresponding specific power of 0.6 kW/m² and volumetric power density of about 0.24 kW/L was obtained.

TABLE 2

Operation of single cell formate MRFBFC.

| Gas flow L/min RTP | Liquid flow ml/min | Pressure kPa(abs) In/Out | Temperature K In/Out | Current mA | Voltage V +/− 0.05 |
|---|---|---|---|---|---|
| Gas = Air | | | | | |
| 0.2 | 10 | 115/100 | 300/300 | 0 | 0.79 |
| 0.2 | 10 | 115/100 | 300/300 | 1300 | 0.11 |
| 0.8 | 10 | 115/100 | 300/300 | 1670 | 0.08 |
| Gas = $O_2$ | | | | | |
| 0.8 | 10 | 115/100 | 325/325 | 2700 | 0.26 |
| 1.3 | 10 | 120/100 | 328/328 | 3100 | 0.19 |
| 3 | 100 | 182/100 | 343/343 | 3500 | 0.17 |

Experiment 2: MRFBBFC Stack

This example demonstrates a number of different parameters for operation of a bipolar fuel stack in accordance with some embodiments of the invention. Useful current densities and volumetric power densities are obtained. In this example, the 3-cell stack was configured as in FIG. 2, incorporating anode A1 from Table 1, distributor D3, cathode C1 and separator comprised of 2(S4)+S8. The unit cell thickness was 1.6 mm and the anode and cathode areas were 20 and 10 cm², respectively. The fuel was aqueous mixture of NaOH (1M) and NaHCO₂ (2M). Some representative results are shown below.

TABLE 3

Bipolar stack performance (3 cells in series).

| Gas flow L/min RTP | Liquid flow ml/min | Pressure kPa(abs) In/Out | Temperature K In/Out | Current mA | Voltage V +/− 0.05 |
|---|---|---|---|---|---|
| Gas = Air | | | | | |
| 0.0 | 10 | 115/100 | 298/298 | 0 | 0.72 |
| 0.1 | 10 | 128/100 | 298/298 | 0 | 1.40 |
| 0.2 | 10 | 135/100 | 298/298 | 0 | 1.5 |
| 0.4 | 10 | 150/100 | 298/298 | 0 | 1.6 |
| 1.0 | 10 | 170/100 | 298/298 | 0 | 1.65 |
| 2.0 | 10 | 200/100 | 298/298 | 0 | 1.6 |
| 2.0 | 10 | 210/100 | 303/303 | 300 | 0.07 |
| 2.0 | 10 | 210/100 | 313/313 | 750 | 0.13 |
| 2.0 | 10 | 210/100 | 323/323 | 1050 | 0.19 |
| 2.0 | 10 | 210/100 | 333/333 | 1150 | 0.20 |
| 2.0 | 10 | 210/100 | 338/338 | 1110 | 0.19 |
| Gas = $O_2$ | | | | | |
| 0.4 | 10 | 170/100 | 333/333 | 0 | 1.65 |
| 0.2 | 10 | 140/100 | 343/343 | 2000 | 0.30 |

Experiment 3: Various Gas Loads on a 3-Cell MRFBBFC Stack

A 3-cell MRFBBFC stack operating at 298 K using an aqueous fuel of NaOH (1M) and sodium formate (2M) with air as oxidant, using A1 anode (20 cm²), D1 distributor, C1 cathode (10 cm²) and a separator comprised of 2(S4)+S8 was run under various gas/liquid (G/L) flow ratios. The open circuit voltages recorded for the various conditions are shown below.

TABLE 4

Effect of gas load on open circuit voltage of MRFBBFC stack (3 unit cells in series).

| Gas flow L/min RTP | Liquid flow ml/min | $E_{oc}$ Volt | Pressure In/Out kPa(abs) |
|---|---|---|---|
| 0 | 6 | 0.76 | 103/101 |
| 0.20 | 6 | 1.00 | 108/101 |
| 0.40 | 6 | 1.15 | 110/101 |
| 1.0 | 6 | 1.30 | 115/101 |
| 2.0 | 6 | 1.45 | 118/101 |
| 3.0 | 6 | 1.50 | 130/101 |
| 7.0 | 6 | 1.47 | 170/101 |

Experiment 4: Different Liquid Phase Fuels in Single Cell

An example of the performance of a single cell MRFBFC using different liquid phase fuels is shown below. In this example, liquid phase fuels of sodium formate, sodium borohydride and methanol in aqueous solution with sodium hydroxide were used, and the fuel cell was purged thoroughly with water before each change of fuel. In this case the unit cell thickness was 2.4 mm, the anode was A3 from Table 1, with an area of 4 cm×5 cm, the distributor was D4, the cathode was C8 (area 3 cm×2 cm), and the separator was prepared by stacking S3+3(S4)+S9. The results of these runs are shown below. The oxidant was air.

TABLE 5

Performance of a single cell MRFBFC with alternate fuels.

| Gas | | Liquid | | Pressure | Temp | | |
|---|---|---|---|---|---|---|---|
| $O_2$ Vol % | Flow L/min RTP | Fuel M/M | Flow ml/min | In/Out kPa(abs) | In/Out K | Current mA | Volts |
| 21 | 1 | OH/HCO₂ 1/1 | 10 | 150/101 | 298/298 | 0 | 0.65 |
| | | | | | | 370 | 0.04 |

TABLE 5-continued

Performance of a single cell MRFBFC with alternate fuels.

| Gas | | Liquid | | Pressure | Temp | | |
|---|---|---|---|---|---|---|---|
| $O_2$ Vol % | Flow L/min RTP | Fuel M/M | Flow ml/min | In/Out kPa(abs) | In/Out K | Current mA | Volts |
| | | $OH/BH_4$ 1/1 | 10 | 160/101 | 298/298 | 0 430 | 0.75 0.04 |
| | | $OH/CH_3OH$ 1/1 | 10 | 160/101 | 298/298 | 0 100 | 0.7 0.01 |

It should be noted in these examples, and for the stack example below, the catalysts used were not chosen or optimized for the specific fuel types. Rather, the examples are given to demonstrate the broad applicability and feasibility of the general MRFBFC concept.

Experiment 5: Different Liquid Phase Fuels in a Stack

A MRFBBFC stack using different fuels is shown in the following example. The unit cell was the same as described above for the single cell examples, however the anode was 2(A4), and the stack consisted of 3 unit cells as in FIG. 2. The operating conditions and results of this example are shown below.

TABLE 6

A 3-cell MRFBBFC stack with alternate fuels.

| Gas | | Liquid | | Pressure | Temp | | |
|---|---|---|---|---|---|---|---|
| $O_2$ Vol % | Flow L/min RTP | Fuel M/M | Flow ml/min | In/Out kPa(abs) | In/Out K | Current mA | Volts |
| 21. | 0.05 | $OH/HCO_2$ 1/4 | 10 | 110/101 | 298/298 | 0 | 1.34 |
| | 1 | | | 140/101 | 298/298 | 0 | 1.55 |
| | 1.5 | | | 170/101 | 298/298 | 120 | 0.06 |
| 21 | 0.2 | $OH/BH_4$ 1/1 | 20 | 150/101 | 298/298 | 0 | 1.63 |
| | 2 | | 10 | 160/101 | 298/298 | 0 | 1.82 |
| | 3 | | 20 | 200/101 | 298/298 | 320 | 0.14 |
| 100 | 3 | | 20 | 200/101 | 298/298 | 0 | 1.6 |
| | | | | 200/101 | 298/298 | 510 | 0.17 |
| | | | | 210/101 | 315/315 | 0 | 1.9 |
| | | | | 210/101 | 315/315 | 800 | 0.5 |

Experiments 6 to 10

The following Experiments 6 to 10 all show operation of single cell mixed reactant fuel cell reactors.

Each reactor was configured according to the fuel cell shown in FIG. 3(*b*) and with the components shown in FIG. 3(*b*) and FIG. 5 and as particularized in Table 1(b).

Referring to FIG. 5, the cell thickness used in Experiments 6 to 10 includes that of the gaskets 3,4,5,6 and the separator 11, but excludes the current collectors 1, 2. This cell thickness ranges from 2.5 to 3.8 mm and is the value used to calculate the volumetric power density of the cell. However it should be noted that this thickness would embrace 2 cells when stacked in the bipolar mode shown in FIG. 2. If the bipolar configuration operates effectively the (un-optimized) volumetric power density of the stack would be up to double the values for the single cell reported in Experiments 6-10.

Experiments 6 to 10 show operation of the single cell reactor using the testing apparatus shown in FIG. 4. In each case the reactor (fuel cell) was operated with a fixed external resistive load of about 0.09 Ohm. The fuel was an aqueous liquid solution of sodium hydroxide plus sodium formate and the oxidant was air or pure oxygen gas. The reactor was insulated to slow heat loss and the feed mixture (fuel+oxidant) was heated to about 85° C. before entering the reactor. The fuel solution was recycled to the reactor as shown in FIG. 4. As the reactor outlet temperature increased over time the following data were recorded: time, current, cell voltage, oxidant flow, fuel flow, outlet temperature, inlet pressure and outlet pressure. These data are displayed in FIGS. 6 to 15.

TABLE 1(b)

Examples of fuel cell components used in Experiments 6 to 10

| Component | Description | ID | Source |
|---|---|---|---|
| ANODE | Pd on Ni/C mat | A5 | Nickel-carbon non-woven mat. HOVO[g] a. 800038, b. 800039 Immersed in aqueous solution of $PdCl_2$ (1 g/L) + HCl (2 g/L), 15 minutes 60° C.(approx). |

TABLE 1(b)-continued

Examples of fuel cell components used in Experiments 6 to 10

| Component | Description | ID | Source |
|---|---|---|---|
| | Pd/Ni on Ni foam or mesh | A6 | Spread [Ni and/or Raney Ni powder]/PVC cement mixture on Ni foam or mesh. Cure, then immerse 50 wt % NaOH, 30 mins at 60° C. Wash, then immerse in aqueous solution of $PdCl_2$ + HCl. as for A6. |
| DISTRIBUTOR | Nickel expanded mesh | D5 | Dexmet[h] 4-Ni-10-125 ca. 0.2 mm thick |
| CATHODE | $Ag/MnO_2$ on GDL | C12 | Avcarb[i]: a. GDS 2120, b. GDS 1120 Bilayer teflonated carbon fibre/carbon black sheet. Brushed with aqueous mixture of $AgNO_3$ + $Mn(NO_3)_2$ + PTFE 30T emulsion, then held at 350° C. in air for 40 minutes. |
| | $Ag/MnO_2$ on GDL | C13 | Sigracet[j]: a. GDL-35-DC, b. GDL-25-DC, c. GDL-35-BC. Bilayer teflonated carbon fibre/carbon black sheet. Brushed with aqueous mixture of $AgNO_3$ + $Mn(NO_3)_2$ + PTFE 30T emulsion, then held at 350° C. in air for 40 minutes. |
| | $Ag/MnO_2$ + Nafion on GDL | C14 | C13 + anode face brushed with Nafion solution then held at 350° C., 15 min. |
| | Ag on GDL | C15 | Sigracet GDL-35-DC with Ag deposited on fibrous (anode) face by treatment with $AgNO_3$ then HCOOH solutions. |
| | M/C/PTFE/Nafion GDE | C16 | Bilayer Teflonated/Nafionated carbon black, catalysed with organo-porphryrin-metal complexes of Co, Fe, Ni (M). |
| | C/PTFE//Ag/$MnO_2$/PTFE on Ni mesh (100#). | C18 | Bilayer. Cathode face spread Teflonated C black. Anode face brush $AgNO_3$ + $Mn(NO_3)_2$ + PTFE 30 T emulsion. Hold at 350° C., 40 mins. Catalyst precursor mixtures may include wetting agents (e.g Triton X100, Makon NF12) and/or pore formers pore formers (e.g. Glycine, $NH_4HCO_3$) |
| GASKET | | G1 | 0.8 mm thick Durabla (Neoprene/asbestos) sheet |
| | | G2 | 1.6 mm thick Durabla (Neoprene/asbestos) sheet |
| | | G3 | Polypropylene sheet: a 0.4 mm, b. 0.7 mm thick |
| | | G4 | 0.2 mm thick 304 stainless steel sheet |
| COLLECTOR | Current collector | K1 | Gold plated copper sheet ca. 2 mm thick |
| SEPARATOR | Microporous polyalkene sheet | S13 | Solupor E9H01A[k] Hydrophilic |
| | Polymer fibre mat | S14 | Swiffer. Hydrophilic. (London Drugs, Vancouver Canada). |
| | Microporous glass mat | S15 | Glass fibre filter GD120125 (Cole Parmer Canada) |
| | Porous PVA sheet | S16 | Cleaning sponge (Great Canadian Superstore, Vancouver, Canada) |
| | Cellulose pulp sheet | S17 | |
| | Microporous polyethylene sheet | S18 | SCIMAT 700/20. Hydrophilic (SCIMAT Ltd. UK) Perforated 1.5 mm diameter holes on 5 mm centres. |
| | C mat | S19 | Graphite fibre mat ca. 10 micron fibre, 9 0 + % porosity, 0.4 mm thick before compression.. |
| | $MnO_2$/C mat | S20 | S18 immersed in aqueous $Mn(CH_3CO_2)_2$, then held at 350° C. for 15 minutes |

Footnotes
[g]Hollingsworth & Vose. E. Walpole MA USA Ni/C mat ca. 10 micron fibre, 90% porosity Uncompressed thickness: 800038 0.4 mm, 800039 0.8 mm (approx.).
[h]Dexmet Corp. Branford CT USA.
[i]Ballard Material Products Inc. Lowell MA USA. Uncompreesed thickness: GDS 2120 0.3 mm, GDS 1120 0.2 mm (approx)
[j]SGL Technologies GmbH Germany Uncompressed thickness: GDL-35-DC 0..35 mm, GDL-25-DC 0.25 mm, GDL-35-BC 0.35 mm. (approx)
[k]DSM Solutech BV Holland. Uncompressed thickness: 0.05 mm (approx).

Experiments 6 to 10 demonstrate that the fuel cell can be made with a wide variant of materials as shown in Table 1(b), whose individual properties and combinations affect the fuel cell performance. These experiments also demonstrate the effect of temperature on fuel cell performance. Open circuit (OC) voltage and specific power density typically increase up to about 65° C. outlet temperature. The subsequent drop in performance seems to be due to flooding of the cathode caused by wetting of the cathode by the liquid phase.

The invention claimed is:
1. A cell unit of a mixed reactant fuel cell, comprising
(a) a porous electronically conductive distributor for flowing therethrough a multiphase mixed reactant fluid having fuel and oxidant each in separate fluid phases, wherein at least one of the fuel and oxidant fluid phases is a liquid;
(b) an anode and a cathode each in fluid and electronic communication with the distributor, wherein the anode comprises a porous material having one or more properties that produce a selected capillary pressure when the reactant fluid contacts the anode, which causes a higher hold up of the fuel fluid phase than the oxidant fluid phase in the pores of the anode when the mixed reactant fluid flows through the distributor, thereby suppressing transfer of oxidant to the anode from the distributor, or wherein the cathode comprises a porous material having one or more properties that produce a selected capillary pressure when the reactant fluid contacts the cathode, which causes a higher hold up of the oxidant fluid phase than the fuel fluid phase in the pores of the cathode when the mixed reactant fluid flows through the distributor, thereby suppressing transfer of fuel to the cathode from the distributor; or both; and (c) a separator positioned relative to one of the anode and the cathode to provide electronic insulation and ionic communication between the cell unit and another adjacent cell unit;

wherein the distributor extends between respective superficial surfaces of the anode and cathode of the cell unit such that the bulk mixed reactant fluid flows through the distributor and by the superficial electrode surfaces under conditions that produce a positive net potential of the fuel cell under load; and wherein the capillary pressures of the anode and cathode porous materials are a function of pore radii of the porous materials, the interfacial tension between the fuel and oxidant fluid phases, and properties of the porous materials which affect the contact angles of the fuel fluid phase relative to the oxidant fluid phase on the anode or cathode surfaces.

2. A cell unit as claimed in claim 1 wherein the mixed reactant fluid includes an ionically conductive liquid and an ionically non-conductive second fluid and the distributor properties are selected to suppress ionic conduction across the thickness of the distributor when the mixed reactant flows through the distributor.

3. A cell unit as claimed in claim 1 wherein the fuel fluid phase is:
    a liquid and the oxidant fluid phase is a liquid or a gas, wherein the selected capillary pressure at the anode is produced by at least one of a pore radius of the anode porous material, an interfacial tension between the fuel and the oxidant fluid phases, and a property of the anode porous material which affects the contact angle of the fuel fluid phase relative to the oxidant fluid phase on the anode surface; or
    a gas and the oxidant fluid phase is a liquid, wherein the selected capillary pressure at the anode is produced by at least one of a pore radius of the anode porous material, the interfacial tension between the fuel and the oxidant fluid phases, and a property of the anode porous material which affects the contact angle of the oxidant fluid phase relative to the fuel fluid phase on the anode surface.

4. A cell unit as claimed in claim 1 wherein the oxidant fluid phase is:
    a liquid, and the fuel fluid phase is a liquid or a gas, wherein the selected capillary pressure at the cathode is produced by at least one of a pore radius of the cathode porous material, an interfacial tension between fuel fluid phase and the oxidant fluid phase, and a property of the cathode porous material which affects the contact angle of the oxidant fluid phase relative to the fuel phase on the cathode surface; or
    a gas and the fuel fluid phase is a liquid, wherein the selected capillary pressure at the cathode is produced by at least one of a pore radius of the cathode porous material, the interfacial tension between the fuel fluid phase and the oxidant fluid phase, and a property of the cathode porous material which affects the contact angle of the fuel fluid phase relative to the oxidant fluid phase on the cathode surface.

5. A cell unit as claimed in claim 3 wherein when the fuel fluid phase is a liquid, the fuel fluid phase is aqueous and the anode is hydrophilic.

6. A cell unit as claimed in claim 5 wherein the oxidant fluid phase is a gas and the cathode is hydrophobic.

7. A cell unit as claimed in claim 1 wherein the separator is intrinsically ionically non-conductive and is wettable by an electrolyte solution and the mixed reactant fluid includes the electrolyte solution.

8. A cell unit as claimed in claim 7 wherein the distributor is resistant to wetting by the electrolyte solution.

9. A cell unit as claimed in claim 1 wherein the separator comprises one of a cation and anion membrane.

10. A cell unit as claimed in claim 1 wherein at least one of the anode or cathode is based on a substrate having a composition selected from the group consisting of metallic foam, metallic felt, metalized carbon fibre mat, metallic mesh, reticulate carbon, carbon felt, carbon fibre paper and carbon cloth.

11. A cell unit as claimed in claim 10 wherein the anode comprises an electrocatalyst selected from the group consisting of Pd, Ru, Mo, Pt or the cathode comprises an electrocatalyst selected from the group consisting of Pt, Pd, Ag, and $MnO_2$.

12. A cell unit as claimed in claim 1 wherein the distributor has a composition selected from the group consisting of metal mesh, expanded metal sheet, metal foam, metal coated plastic or glass reticulate or mesh, and reticulate carbon.

13. A cell unit as claimed in claim 1 wherein the multiphase mixed reactant fluid comprises a liquid and a gas phase or two immiscible liquid phases.

14. A cell unit as claimed in claim 13 wherein the multiphase mixed reactant fluid comprises:
    a fuel in the liquid phase selected from the group consisting of: formate salts, formic acid, methanol, borohydride salts, hydrazine, hydroxylamine salts, ethanol, ethylene glycol, methyl formate, and dimethyl ether; or
    a fuel in the gas phase selected from the group consisting of hydrogen, ammonia, methanol vapour, ethanol vapour, formic acid vapour and dimethyl ether.

15. A cell unit as claimed in claim 13 wherein the multiphase mixed reactant fluid comprises an oxidant in the liquid phase selected from the group consisting of hydrogen peroxide, hydroperoxides, peroxides, peroxysalts, dioxiranes, nitric acid, nitromethane, ferric salts, ceric salts, vanadium salts, and permanganate salts.

16. A cell unit as claimed in claim 13 wherein the multiphase mixed reactant fluid comprises a fuel in the liquid phase and an oxidant in another liquid phase in which one of the fuel phase and the oxidant phase is an ionic insulator.

17. A fuel cell stack comprising at least two cell units as claimed in claim 1 in adjacent contact with each other.

18. A mixed reactant fuel cell comprising
    (a) a porous electronically conductive first distributor for flowing therethrough a multiphase mixed reactant fluid having fuel and oxidant each in separate fluid phases, wherein at least one of the fuel and oxidant fluid phases is a liquid;
    (b) an anode in fluid and electronic communication with the first distributor;
    (c) an electronically conductive second distributor for flowing therethrough the multiphase mixed reactant fluid;
    (d) a cathode in fluid and electronic communication with the second distributor; and (e) a separator positioned between the anode and cathode to provide electronic insulation and ionic communication there-between;

wherein the anode has a porous material having one or more properties that produces a selected capillary pressure when the reactant fluid contacts the anode which causes a higher hold-up of the fuel fluid phase than the oxidant fluid phase in pores of the anode when the mixed reactant fluid flows through the first distributor, thereby suppressing transfer of oxidant to the anode from the distributor; or the cathode has a porous material having one or more properties that produces a selected capillary pressure when the reactant fluid contacts the cathode, which causes a higher hold-up of the oxidant fluid phase than the fuel fluid phase in pores of the cathode when the mixed reactant fluid flows through the second distributor, thereby suppressing transfer of fuel to the cathode from the distributor, or both; and wherein the capillary pressures of the anode and cathode porous materials are a function of pore radii of the porous materials, the interfacial tension between the fuel and oxidant fluid phases, and properties of the porous materials which affect the contact angles of the fuel fluid phase relative to the oxidant fluid phase on the anode or cathode surfaces.

19. A cell unit as claimed in claim 1 wherein the anode, cathode, distributor and separator are interconnected concentric cylindrical or spiral wound structures surrounding a central mandrel.

20. A cell unit as claimed in claim 1 wherein one fluid phase is an ionic conductor and the other fluid phase is an ionic insulator, and the flow of each fluid phase is controlled to disperse the ionically conductive phase in the distributor and suppress ionic conduction through the distributor; or the volumetric flow ratio of the ionic insulator fluid phase to the ionic conductor fluid phase is in the range about 10 to about 1000.

21. A fuel cell stack as claimed in claim 17 wherein one fluid phase is an ionic conductor and the other is an ionic insulator, and the flow of each fluid phase is controlled to disperse the ionically conductive phase in the distributor and suppress ionic conduction through the distributor; or the volumetric flow ratio of the ionic insulator fluid phase to the ionic conductor fluid phase is in the range about 10 to about 1000.

22. A fuel cell as claimed in claim 18 wherein the anode, cathode, distributor and separator are interconnected concentric cylindrical or spiral wound structures surrounding a central mandrel.

23. A cell unit of a mixed reactant fuel cell, comprising
(a) a porous electronically conductive distributor for flowing therethrough a multiphase mixed reactant fluid having fuel and oxidant each in separate fluid phases, wherein at least one of the fuel and oxidant fluid phases is a liquid;
(b) an anode and a cathode each in fluid and electronic communication with the distributor, wherein the anode comprises a porous material having one or more properties that produce a selected capillary pressure when the reactant fluid contacts the anode, which causes a higher hold up of the fuel fluid phase than the oxidant fluid phase in the pores of the anode when the mixed reactant fluid flows through the distributor, thereby suppressing transfer of oxidant to the anode from the distributor, or wherein the cathode comprises a porous material having one or more properties that produce a selected capillary pressure when the reactant fluid contacts the cathode, which causes a higher hold up of the oxidant fluid phase than the fuel fluid phase in the pores of the cathode when the mixed reactant fluid flows through the distributor, thereby suppressing transfer of fuel to the cathode from the distributor; or both; and
(c) a separator positioned relative to one of the anode and the cathode to provide electronic insulation and ionic communication between the cell unit and another adjacent cell unit;

wherein the distributor extends between respective superficial surfaces of the anode and cathode of the cell unit such that the bulk mixed reactant fluid flows through the distributor and by the superficial electrode surfaces under conditions that produce a positive net potential of the fuel cell under load; and wherein the distributor has a composition selected from the group consisting of metal mesh, expanded metal sheet, metal foam, metal coated plastic or glass reticulate or mesh, and reticulate carbon.

24. A cell unit as claimed in claim 1 further comprising a multiphase mixed reactant fluid having fuel and oxidant each in separate fluid phases, wherein at least one of the fuel and oxidant fluid phases is a liquid, wherein the distributor flows the reactant fluid therethrough, and the anode causes a higher hold up of the fuel fluid phase than the oxidant fluid phase in the pores of the anode.

25. A cell unit as claimed in claim 1 further comprising a multiphase mixed reactant fluid having fuel and oxidant each in separate fluid phases, wherein at least one of the fuel and oxidant fluid phases is a liquid, wherein the distributor flows the reactant fluid therethrough, and the cathode causes a higher hold up of the oxidant fluid phase than the fuel fluid phase in the pores of the cathode.

26. A fuel cell as claimed in claim 18 further comprising a multiphase mixed reactant fluid having fuel and oxidant each in separate fluid phases, wherein at least one of the fuel and oxidant fluid phases is a liquid; wherein the first and second distributors flow the reactant fluid therethrough; and wherein the anode causes a higher hold up of the fuel fluid phase than the oxidant fluid phase in the pores of the anode.

27. A fuel cell as claimed in claim 18 further comprising a multiphase mixed reactant fluid having fuel and oxidant each in separate fluid phases, wherein at least one of the fuel and oxidant fluid phases is a liquid; wherein the first and second distributors flow the reactant fluid therethrough; and wherein the cathode causes a higher hold up of the oxidant fluid phase than the fuel fluid phase in the pores of the cathode.

* * * * *